United States Patent [19]

Cunningham et al.

[11] 4,144,496
[45] Mar. 13, 1979

[54] MOBILE COMMUNICATION SYSTEM AND METHOD EMPLOYING FREQUENCY REUSE WITHIN A GEOGRAPHICAL SERVICE AREA

[75] Inventors: Marion L. Cunningham, Orlando; John R. Endicott, Maitland; Lionel D. Freeman, Orlando, all of Fla.

[73] Assignee: Harris Corporation, Cleveland, Ohio

[21] Appl. No.: 667,782

[22] Filed: Mar. 17, 1976

Related U.S. Application Data

[63] Continuation of Ser. No. 360,559, May 15, 1976, abandoned.

[51] Int. Cl.² .................... H04B 7/00; H04M 11/00
[52] U.S. Cl. .................................. 325/53; 179/2 EB
[58] Field of Search ............................... 325/53–55; 179/41 A, 2 EB

[56] References Cited

U.S. PATENT DOCUMENTS

| | | | |
|---|---|---|---|
| 2,848,545 | 8/1958 | Mitchell | 179/41 A |
| 3,310,741 | 3/1967 | Uitermark et al. | 325/53 X |
| 3,564,150 | 2/1971 | Muller | 179/2 EB |
| 3,571,519 | 3/1971 | Tsimbidis | 325/55 X |
| 3,663,762 | 5/1972 | Joel, Jr. | 179/41 A |
| 3,729,595 | 4/1973 | Sarati et al. | 179/41 A |
| 3,763,324 | 10/1973 | Garcia et al. | 179/41 A X |
| 3,764,915 | 10/1973 | Cox et al. | 179/41 A |
| 3,819,872 | 6/1974 | Hamrick | 179/41 A |
| 3,836,726 | 9/1974 | Wells et al. | 79/41 A |
| 3,894,194 | 7/1975 | Frost | 325/55 X |
| 3,898,390 | 8/1975 | Wells et al. | 179/41 A |

Primary Examiner—John C. Martin
Assistant Examiner—Aristotelis M. Psitos
Attorney, Agent, or Firm—Burns, Doane, Swecker & Mathis

[57] ABSTRACT

A communication method and system for providing two-way radio communication links between fixed stations and mobile units, particularly suitable for use in mobile telephone communications. A geographical service area is sectionalized through the use of omnidirectional and directional antennas resulting in increased call capacity for a given number of available communication channels. An orderly, cost-effective manner for accommodating service area expansion, a dynamic channel assignment technique for accommodating variations in user density and a technique for maintaining an established call as a mobile unit moves throughout the sectionalized service area are also disclosed.

79 Claims, 19 Drawing Figures

BASE STATION

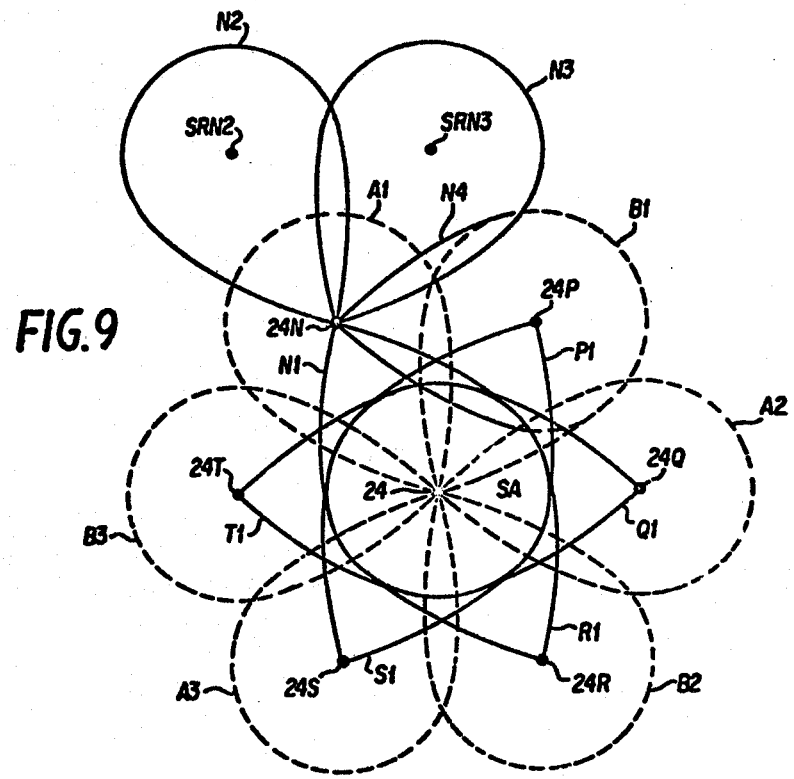
FIG.9
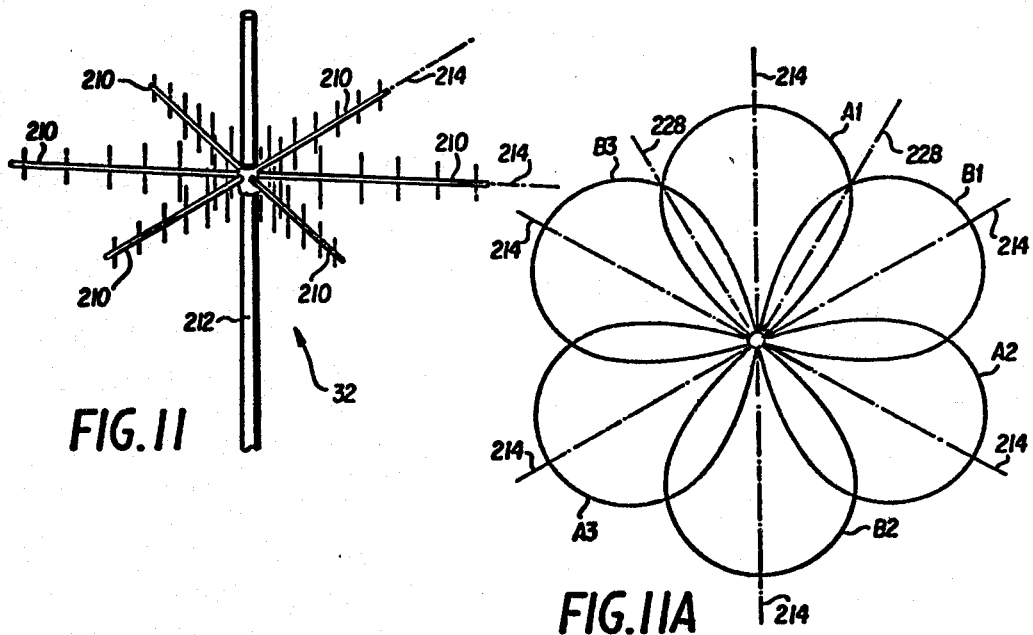
FIG.11
FIG.11A

MOBILE COMMUNICATION SYSTEM AND METHOD EMPLOYING FREQUENCY REUSE WITHIN A GEOGRAPHICAL SERVICE AREA

This is a Continuation, of application Ser. No. 360,559 filed May 15, 1973, now abandoned.

BACKGROUND OF THE INVENTION

The present invention relates to mobile radio communication systems and, in particular, to a mobile radiotelephone method and system in which a geographical area is provided with mobile radiotelephone service by dividing the geographical area into smaller geographical areas through the use of directional and omnidirectional antennas.

Approximately twelve communication channels, each including two distinct frequencies for two-way communications (an up-link and a down-link), are typically available for use in present day mobile telephone systems. In one known system, usually referred to as Improved Mobile Telephone Service (IMTS), communication is established over the available channels from a wire line telephone system to mobile units through the use of transmitters which transmit omnidirectionally throughout a large geographical area or zone from an antenna approximately centered in the area. A plurality of satellite receivers are spaced throughout the geographical area to receive transmissions from the mobile units and relay the transmissions to the central location. Calls are established through seizure of a marked idle channel by a mobile unit and by placing or receiving a call over the seized marked idle channel.

With only twelve channels available for use in this type of system, only twelve simultaneous conversations are possible and, not only is the total number of subscribers in a service area necessarily limited, but also the subscribers who do obtain service tend to find circuits busy a very high percentage of the time when attempting to place a call. It can thus be seen that 12-channel systems based upon a large zone coverage from a central location have been unable to meet present user demands, let alone future requirements for mobile radiotelephone service. As a result, several different arrangements have been employed in an attempt to increase the capacity of a system.

One attempt to improve channel availability is to provide frequency reuse of the existing channels by changing radio coverage philosophy from that of high power transmission, long range reception to low power transmission, short range reception. This type of radio coverage is typically referred to as a "small zone" concept in which small zones of reception and transmission are defined by spaced based stations. In a small zone system, channel reuse is permissible where sufficient spacing exists between two small zones, and such reuse makes improved channel availability possible.

For example, increased capacity may be attained by dividing a large service area or zone into small service areas or zones with a base station at the center of each small zone. Transmitters and receivers at each base station together provide mobile telephone coverage of the large geographical area. In such an arrangement, channels used in one small zone may be reused in another small zone if sufficient spacing exists between the two zones. Thus, in a large metropolitan area, for example, available channels may be reused in several separated small zones with a minimum of interference.

The equipment requirements in a small zone system may greatly exceed that required in a large zone system but the increased system capacity may more than balance this increased expense. Another drawback in a typical small zone system is that the mobility of a mobile telephone unit may also be somewhat decreased due to the movement of a mobile unit from one small zone into another and the resultant loss of the signal channel over which a call is established.

A further problem in known mobile telephone systems is the problem of increasing area coverage as the outer limits of the service area expand. Relatively facile expansion of the mobile telephone system as a service area grows in size is extremely important both in efficiently employing the limited channels presently allocated to mobile telephone service and in making proper use of the vastly increased number of channels which may become available in the UHF spectrum.

It is accordingly an object of the present invention to provide a novel method and mobile communication system not limited to a small zone concept which obviates these and other problems associated with known mobile telephone systems.

It is another object of our invention to provide an improvement in mobile communication systems as the result of the combined use of an omnisectional array (OSA) antenna, sector area beacon transmitters, sector area monitor receivers, and a central processor, thus making a greater degree of re-use of frequency channels possible.

It is a further object of the present invention to provide a novel method and mobile telephone system for providing significant frequency re-use, thus more efficiently employing the communication channels allocated to mobile telephone service in a manner compatible with existing mobile telephone equipment.

It is another object of the present invention to provide a novel method and mobile telephone system which is readily expandable to accommodate the growth of a service area.

It is yet another object of the present invention to provide a novel method and mobile telephone system which employs a combination of directional and omnidirectional antennas to increase mobility of mobile units operating within a service area and to minimize problems caused by back radiation from the directional antennas.

It is yet a further object of the present invention to provide a novel method and system for establishing mobile telephone communication within a predetermined zone or sector with a relatively high degree of zone specificity.

It is still a further object of the present invention to provide a novel method and system for providing two-way communication to and from mobile units in a manner both compatible with existing mobile communication equipment and readily expandable to accommodate system growth with the addition of fewer base stations than are required in prior art systems.

It is yet a further object of our invention to provide a novel frequency re-use capability in a land mobile radio system, accomplished at a greatly reduced cost, insofar as base station equipments and real property purchases are concerned, when compared with the cost of implementing a conventional small zone concept.

It is yet a still further object of our invention to provide a highly effective zone transfer capability in a mobile radio system, accomplished by determining the approximate location of a budy mobile unit, by measuring and comparing its signal strength as received at monitoring sites, and then assigning the proper transmitter frequency and base station site and sector via a central processor algorithm.

These and other objects and advantages are accomplished in accordance with the present invention as will become apparent to one skilled in the art to which the invention pertains from a perusal of the following detailed description and claims when read in conjunction with the drawings.

BRIEF DESCRIPTION OF THE DRAWINGS

FIGS. 8–10 are plan views of mobile telephone service areas illustrating various system expansion techniques employing various directional coverage patterns according to the present invention;

FIGS. 11 and 12 are pictorial views of alternative embodiments of directional antenna arrays for use in the system of the present invention;

FIG. 11A is a plan view of a mobile telephone service area illustrating the directional coverage obtained with the directional antennas of FIGS. 11 and 12;

DETAILED DESCRIPTION

Embodiments of the present invention and various features thereof are described hereinafter in the environment of a mobile telephone system as set forth in the following table of contents:

I. General Description of One System Embodiment (FIGS. 1 and 2)
 A. Central Control Unit (FIG. 3)
 B. Base Station (FIG. 4)
 C. Adaptive Channel Assignment Technique (FIG. 4)
 D. Fixed Frequency Dynamic Channel Assignment Unit (FIG. 5)
II. Description of Another System Embodiment (FIGS. 6 and 7)
III. Service Area Expansion (FIGS. 8A, 8B, 8C, 9 and 10)
IV. Directional Antenna Array (FIGS. 11 and 12)
V. Sector Change Techniques (FIGS. 13, 14, 15 and 16)

I. GENERAL DESCRIPTION OF ONE SYSTEM EMBODIMENT

One embodiment of the present invention as employed in a large zone mobile telephone system is illustrated in FIGS. 1–5. The embodiment of FIGS. 1–5 is compatible with existing IMTS equipment, and in particular, existing IMTS mobile units operable to seize a marked idle channel. The mobile units and other equipment specified hereinafter as being conventional will thus not be described in detail.

Figure 1:
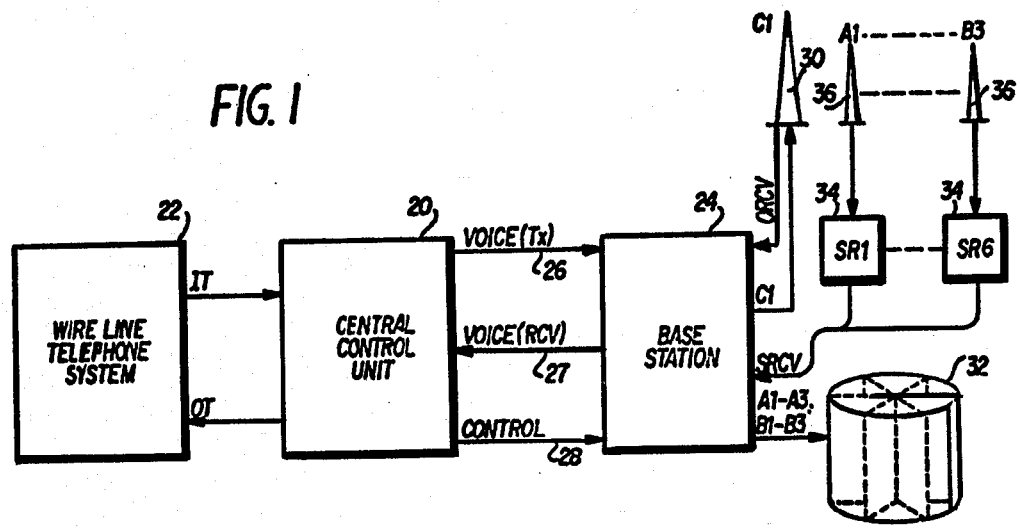
FIG. 1 is a functional block diagram of one embodiment of a mobile telephone system according to the present invention.
Figure 2:
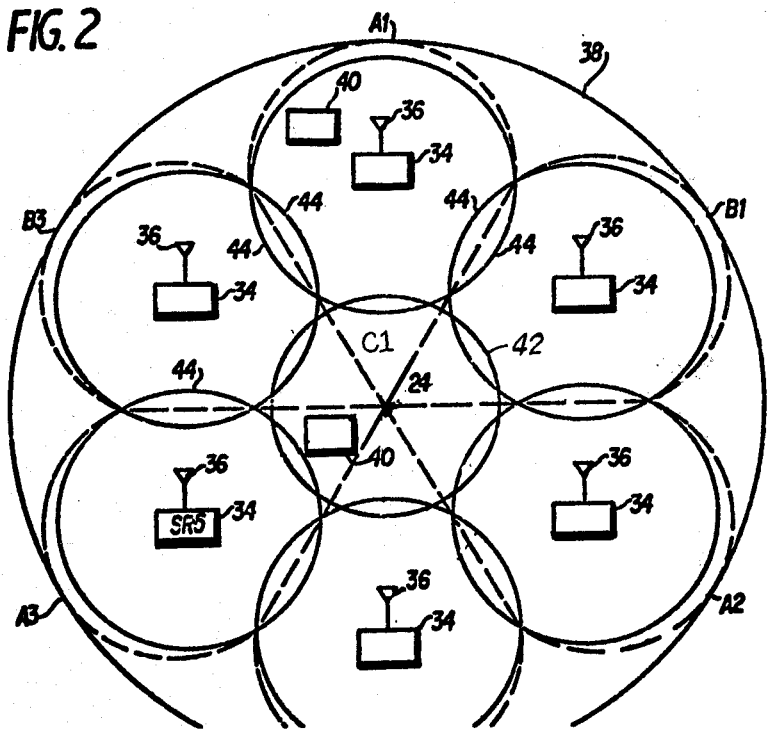
FIG. 2 is a plan view of a mobile telephone service area illustrating the communication coverage pattern of the system of FIG. 1.

Referring now to FIGS. 1 and 2 wherein one embodiment of the system is generally illustrated, a central control unit 20 may be conventionally interfaced with the incoming or input trunk lines IT and the outgoing or output trunk lines OT of a commercially installed wire line telephone system 22. The central control unit 20 may control the selective connection of the incoming trunks IT to a base station 24 via pairs of voice grade transmission lines 26, hereinafter referred to by the designation VOICE (TX). The central control unit 20 may also transmit control signals CONTROL by way of transmission lines 28 to provide control of the base station operation.

As will hereinafter be described in greater detail, the base station 24 may include a plurality of transmitters (FIG. 4) and the output signals from certain of the transmitters may be applied to a transmitting portion of an omnidirectional antenna 30 located at or in proximity to the base station 24 at approximately the center of the service area 38 illustrated in FIG. 2. The output signals from other transmitters at the base station 24 may be applied to directional sections or segments of a directional antenna array 32 also located at or in proximity to the base station 24 at approximately the center of the service area 38. the omnidirectional antenna 30 provides mobile telephone service to a sector or zone C1 of a mobile telephone service area surrounding the base station 24 over predetermined communication channels as will subsequently be described in detail. Each section of the directional antenna array 32 provides service to a different one of a plurality of sectors A1–A3 and B1–B3 extending radially outwardly from the antenna array 32 into the mobile telephone service area, as will also subsequently be described in detail.

For example, as is generally indicated in FIG. 1, a group of transmitter output signals designated C1 may be applied to the omnidirectional antenna 30 serving the correspondingly designated sector C1 of FIG. 2. Groups of transmitter output signals A1–A3 and B1–B3 may be applied to selected sections or segments of the directional antenna array 32 serving the correspondingly designated sectors A1–A3 and B1–B3 of FIG. 2. The system employing this combination of directional and omnidirectional service area coverage is hereinafter referred to as an omnisectional array (OSA) system.

In addition, the base station 24 may include a plurality of receivers (FIG. 4) and a signal ORCV from a receiving portion of the omnidirectional antenna 30 may be applied to these receivers at the base station. Signals received from the mobile units by the receivers at the base station 24 over the directional antenna array 32 and the onmidirectional antenna 30 may be supplied from the base station 24 to the central control unit 20 by way of voice grade transmission lines 27 designated VOICE (RCV) hereinafter.

In providing broadcast coverage of a large area, e.g., an area having a radius of about 15-20 miles, reception of signals by way of the directional antenna array 32 may result in low quality voice communications. To improve reception from the mobile units, a plurality of satellite receivers 34 (designated SR1-SR6 to facilitate the description) may be connected to associated onmidirectional antennas 36. The satellite receivers 34 may be spaced throughout a mobile telephone service area in accordance with a predetermined pattern as will hereinafter be described in greater detail to receive signals from mobile units in the service area. The signals received from the mobile units by the satellite receivers 34 may be transmitted to the base station 24 by way of voice grade transmission lines as the SRCV signals and may be transmitted from the base station 24 to the central control unit 20 by way of the VOICE (RCV) lines 27.

With continued reference to FIGS. 1 and 2, the system of the present invention may service a large zone or service area 38 and provide telephone communications between the wire line telephone system 22 and mobie units 40 within the service area 38. The omnidirectional antenna 30 at the base station 24 may define by its propagation pattern one small omnidirectionally defined service zone or sector within the service area 38 with the base station 24 at the center of the small sector or zone as is generally indicated by the circle 42. Within the zone 42, communications between the wire line telephone system 22 and mobile units 40 may thus be established in a conventional manner through the use of the omnidirectional antenna 30 and the equipment at the base station 24 under the control of the central control unit 20.

The directional antenna array 32 may be structured to define a plurality of directionally defined service zones or sectors A1-A3 and b1-B3 extending radially outwardly from the base station 24 and together providing coverage of the entire large zone or service area 38. In the example illustrated in FIG. 2, six sectors are defined by the individual directional antennas or segments of the directional antenna array 32 (e.g., FIGS. 11, 11a and 12) although it should be understood that a fewer or greater number of sectors may be established by the directional antenna array 32 as desired. The six sectors may overlap slightly and together provide 360° of broadcast (and reception) coverage.

In each of the sectors A1-A3 and B1-B3, one or more associated satellite receivers SR1-SR6 may be provided to omnidirectionally receive signals transmitted from the mobile units 40 within essentially omnidirectional receiving zones surrounding the satellite receivers as is generally indicated by the circles 44. The signals received by the satellite receivers SR1-SR6 may be transmitted to the central control unit 20 as was previously described to provide the return portion of the two-way link between the wire line telephone system 22 and the mobile units 40, transmission to the mobile units located in the zones 44 being provided from the directional antenna array 32 as was previously described.

With continued reference to FIGS. 1 and 2, twelve two-way communications channels are typically available for use in present mobile telephone systems and, in accordance with the present invention, may be distributed for use in the zones or sectors A1-A3, B1-B3 and C1 as follows:

TABLE I

| Zone | Channel* |
|------|----------|
| A1 | 1-4 |
| B1 | 5-8 |
| A2 | 1-4 |
| B2 | 5-8 |
| A3 | 1-4 |
| B3 | 5-8 |
| C1 | 9-12 |

*Numbers herein do not represent frequency.

As can be seen from Table I, the twelve available communication channels may be reused in the sectors A1-A3 and B1-B3 as long as there exits at least one sector of separation between those sectors in the service area 38 using the same channels. For example, channels 1-4 may all be utilized in each of the sectors A1, A2 and A3 in that these sectors are separated by at least one of the sectors B1, B2 and B3. Since the sectors B1-B3 are separated by at least one of the sectors A1, A2 and A3, the channels 5-8 may be reused in sectors B1-B3. Of course, it should be understood that other distributions of channels to the various zones is possible to meet the particular requirements of a specific installation.

Moreover, it should be understood that channels may be dynamically assigned to various zones to meet varying user density requirements as long as the assignment of a channel to a zone is accomplished on a noninterfering basis, i.e., sufficient separation is provided between zones emplying the same channel. If dynamic channel assignment is employed, remotely tunable transmitters may be used and the satellite receivers may be remotely tunable or standby receivers may be provided. One technique which may be employed for dynamically assigning channels in response to variations in user density is described in United States Patent application Ser. No. 360,560 and now U.S. Pat. No. 3,898,390 for "Method and System for Multiple Zone Communication" by J. D. Wells et al, filed concurrently herewith and assigned to the assignee of the present invention. The Wells et al application has now become U.S. Pat. No. 3,898,390, and its teachings are hereby incorporated herein by reference.

Typically, the front-to-back ratio of the sections of the directional antenna array 32 at the base station 24 may be such that the antenna section providing service in the sector A1 may radiate at a reduced power level in the opposite direction, i.e., into the sector B2. In addition, a mobile unit 40 traveling in the vicinity of the base station 24 may rapidly move from one sector defined by the directional antenna array 32 into another sector. In an IMTS type system, the same channel must be available for use in the adjacent sector into which the mobile unit 40 moves to prevent a loss of communication. To alleviate these problems, small zone C1 served by the omnidirectional antenna 30 is established and assigned channels preferably differing from all other assigned channels to service those mobile units in the immediate vicinity of the base station 24.

To achieve compatibility with existing IMTS mobile units, one of the free or idle channels in each of the sectors A1-A3, B1-B3 and C1 may be marked with a tone hereinafter referred to as an "idle channel marker"

by modulating the signal transmitted at the idle channel frequency with the marker tone. In accordance with the embodiment of the invention illustrated in FIGS. 1 and 2, the transmitter transmitting the idle channel marker in each of the sectors A1–A3 and B1–B3 may transmit at a reduced power level relative to the normal power level employed for communicating after a call is established. Transmission of all idle channel markers in sectors A1–A3 and B1–B3 at a reduced power level, e.g., six dB below the level of the signals from those transmitters engaged in calls, increases the probability of proper idle channel seizure by the mobile units operating within the various sectors of the service area 38.

For example, channel 1 may be available in sector A1 and may be designated as the idle channel by transmitting the idle channel marker or tone on channel 1 in sector A1. A mobile unit 40 entering sector A1 will search for a channel having an idle channel marker and will lock onto that marked channel. Since the marked channel is directionally broadcast in sector A1 at a reduced signal level, a mobile unit in sector A2 is much more likely to lock onto and track the idle channel broadcast in sector A1 by the directional antenna section serving the A1 service sector than it is to lock onto the marked idle channel in either of the adjacent sectors B1 or B3. This primarily results from the capture characteristics of the typical FM receivers utilized in the mobile units. Some ambiguity may persist at the periphery of zone C1, but the back-to-front antenna ratio problem and interzone movement problems are less serious at the periphery of zone C1 and an overall improvement thus results.

In placing a call from the wire line telephone system 22 of FIG. 1 to a mobile unit 40 shown in FIG. 2, the central control unit 20 is accessed by a subscriber to the wire line telephone system 22 via the incoming trunk lines IT. The mobile subscribers address, e.g., in the form of a four-digit telephone number following the initial three-digit access code, may then be broadcast by the base station 24 under the control of the central control unit 20 on the idle channel in each of the seven sectors A1–A3, B1–B3 and C1.

Upon receipt of and proper decoding of the broadcast mobile unit address over the idle channel, the addressed mobile unit 40 may return a supervisory signal followed by an appropriate identifying code resulting in seizure of the idle channel by the called mobile unit. Since the mobile unit transmitters are typically less powerful than the base station transmitters, the response from the mobile unit 40 may be relayed to the central control unit 20 via the satellite receiver 34 tuned to the return link, i.e., the up-link, of the seized idle channel in the appropriate sector.

The central control unit 20 thereafter designates and marks a new idle channel in that sector in which the idle channel is seized by the mobile unit 40. Moreover, the central control unit 20 commands the appropriate transmitter at the base station 24 to increase its output power level to normal operating power, e.g., increases the transmitter output power level by 6 dB.

After the idle channel has been seized by the called mobile unit, the central control unit 20 performs the necessary switching to connect the appropriate incoming trunk line IT to the appropriate transmitter in the base station 24 by way of the voice lines (VOICE (TX). Similarly, the CONTROL signal from the central control unit 20 effects the connection of the appropriate receiver of the satellite receivers 34 tuned to the seized idle channel to the appropriate outgoing trunk line OT by way of the voice lines VOICE (RCV).

In placing a call from a mobile unit 40 to a fixed telephone in the wire line system 22, the operator of the mobile unit 40 may effect the transmission of an off-hook signal and/or other appropriate supervisory control signals to the central control unit 20 over the idle channel or to which the mobile unit is locked resulting in seizure of the idle channel by the mobile unit. The central control unit 20 may thereafter seize one of the available outgoing trunks OT and connect the mobile unit 40 to the seized outgoing trunk OT by way of the seized communication channel. Dialing pluses or tones may thereafter be transmitted directly from the mobile unit 40 to the seized outgoing trunk over the seized communication channel and the appropriate switching and signaling will be accomplished by the wire line telephone system 22 to connect the mobile unit to the desired wire line telephone system subscriber or to another mobile unit.

A. CENTRAL CONTROL UNIT

Figure 3:
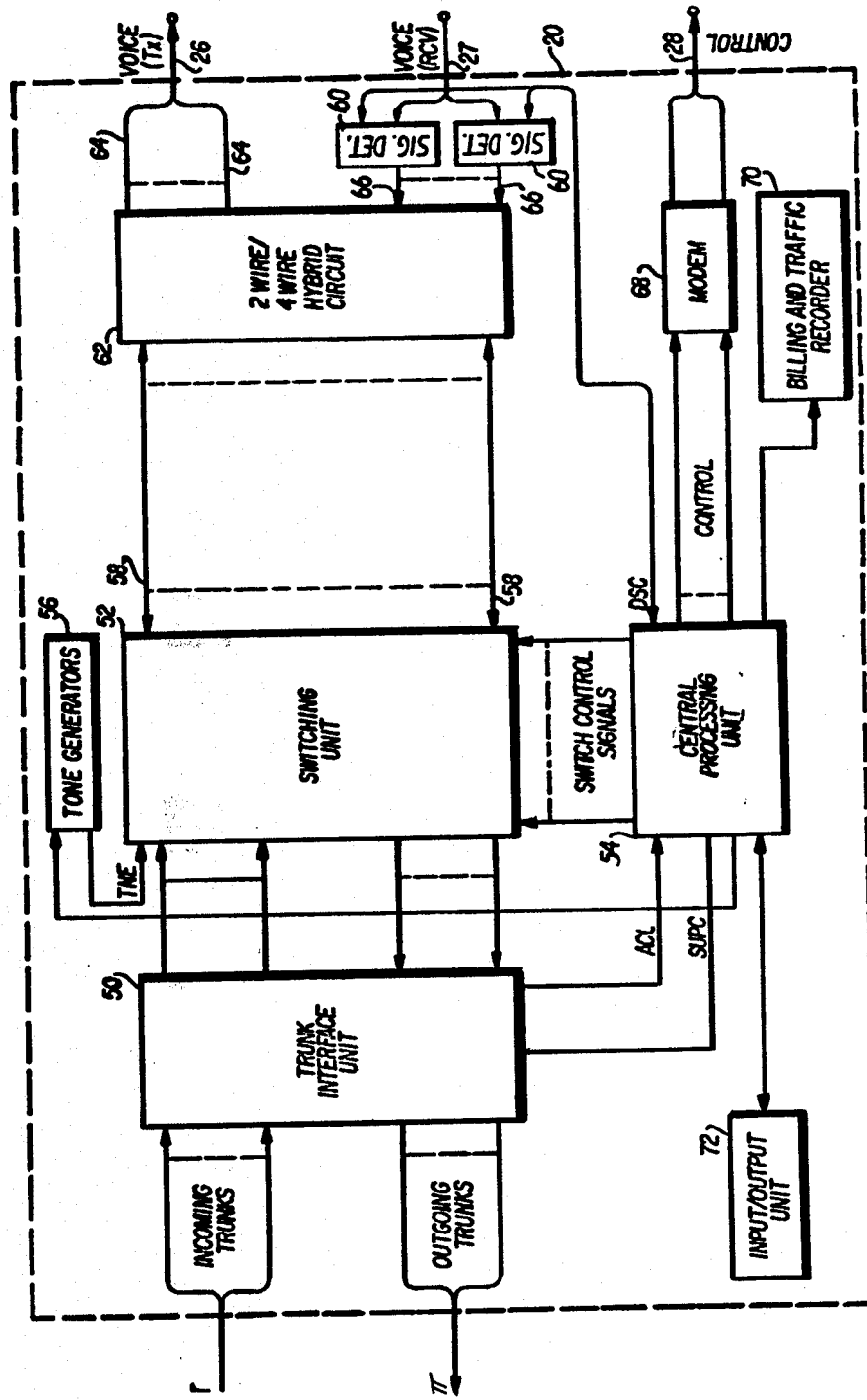
FIG. 3 is a functional block diagram of one embodiment of the central control unit of FIG. 1.

One embodiment of the central control unit 20 of FIG. 1 employed in the OSA system is illustrated in greater detail in FIG. 3 to facilitate an understanding of the operation of the system of the present invention.

Referring now to FIG. 3, the incoming trunk lines IT and the outgoing trunk lines OT may be connected through a suitable conventional trunk interface unit 50 to a suitable conventional switching unit 52 such as a square or rectangular single stage switch matrix or a multistage switch matrix. Detectors in the trunk interface unit 50 may provide access signals ACCS such as telephone system supervisory and status signals and address signals identifying the called mobile unit. The detected ACCS signals may be applied to a central processing unit 54 and various supervisory control and status signals SUPC, e.g., on-hook and off-hook signals, may be generated by the central processing unit 54 and supplied to the trunk interface unit 50 for supervision of incoming and outgoing calls in a conventional manner.

Although not shown in FIG. 3, direct operator lines may be provided between a switchboard and the trunk interface unit 50. With such an arrangement, an operator may be contacted to place calls to mobile units not ordinarily assigned to the system and to perform other call intercept, information or control services which may be required.

The central processing unit 54 may generate various switch control signals for application to the switching unit 52 to selectively connect the interfaced incoming and outgoing trunk lines IT AND OT, as well as various tone signals generated by conventional tone generators 56, to a plurality of two-wire lines generally indicated at 58. Each of the two-wire lines 58 may be connected to a two-wire/four-wire hybrid circuit 62. The two-wire/four-wire hybrid circuit 62 may separate the signals on the two-wire lines 58 into incoming and outgoing signals for transmission to and from the system transmitters and receivers by way of voice grade line pairs 64 and 66, respectively.

Signals received over the voice lines VOICE (RCV) via the line pairs 66 may include supervisory signals indicating, for example, an off-hook condition of a mobile unit or the like. These signals from the mobile units may be detected by a suitable conventional signal detector 60 associated with each receive voice line pair 66 and applied to the central processing unit 54 as the detected supervisory control signals DSC. For example, the seizure of a marked idle channel by a mobile unit subscriber wishing to place a call may be indicated by an appropriate signal or guard tone transmitted over the seized channel by the mobile unit. The signal detector 60 connected to the lines designated for service of the receiver serving the seized channel may detect the guard tone indicating seizure of the channel and provide an appropriate indication in the form of the DSC signal. In response to this DSC signal, the central processing unit 54 may seize an available outgoing trunk OT through the generation of an appropriate supervisory control signal SUPC and may generate an appropriate base station control signal CONTROL. The CONTROL signal may be applied from the central processing unit 54 to the base station 24 via a suitable conventional modem 68 and the control signaling lines 28.

The central processing unit 54 may also generate billing and traffic signals from the various calling information supplied thereto and these signals may be applied to a suitable billing and traffic recorder 70 to provide a record of the billing and traffic data. Moreover, a suitable conventional input/output unit 72 such as a teletype unit may be provided to permit communication between an operator and the central control unit 20 and central processing unit 54. Communication between the input/output unit 72 and the central processing unit 54 may be desirable, for example, when new subscribers are added to the system or when other changes in the system make-up are required.

The operation of the central control unit 20 of FIG. 3 may be more clearly understood through a discussion of the operation thereof in placing calls to and from the wire line telephone system 22 and the mobile units 40.

When a call is placed from the wire line telephone system 22, the appropriate signaling is initiated over one of the incoming trunks IT connected to the central control unit 20. The trunk interface unit 50 detects the request for service on the seized incoming trunk and connects the incoming trunk to the appropriate lines 58 through the switching unit 52. The address of the called mobile unit may thereafter be transmitted through the switching unit 50 and to the voice lines VOICE (TX) for transmission to the transmitters at the base station 24 over which the idle channel marker is presently being transmitted.

Since the switching of the incoming call to the VOICE (TX) lines 26 is controlled by the central processing unit 54, the central processing unit 54 may simultaneously remove the idle channel marker from the transmitters at the base station 24 which were previously designated as the idle channel transmitters. For example, the idle channel marker may be one of the tone signals TNE generated by the tone generator 56 and applied to the appropriate transmitters through the switching unit 52 in response to the switch control signals from the central processing unit 54. When a call is to be placed to a mobile unit, the central processing unit 54 may block the idle channel marker from the tone generators 56 and connect the seized incoming trunk to the idle channel transmitters while simultaneously increasing the output power level of the idle channel transmitters through the application of the appropriate CONTROL signals to the base station 24 by way of the signaling lines 28.

When the called mobile unit responds with an appropriate signal, the response signal is transmitted to the central control unit 20 over the VOICE (RCV) lines 27 and is detected by an appropriate one of the signal detectors 60 as the DSC signal. The central processing unit 54 thereafter generates the appropriate supervisory control signals SUPC and switch control signals in response to the detected signal DSC returned from the called mobile unit and connects the receiver with which the called mobile unit is communicating to an available one of the outgoing trunks OT. Thereafter, the central processing unit 54 may designate another available channel in the sector in which the previously idle channel was seized as the new idle channel and apply the appropriate idle channel marker to the transmitter serving that idle channel. Likewise, the central processing unit 54 may apply the marker tone to the transmitters serving the idle channel in each of the other sectors at any time after the called mobile unit has responded.

In placing a call from a mobile unit to a telephone of the wire line telephone system or another mobile, the mobile unit is initially locked onto the idle channel serving the sector in which the mobile unit is located. The mobile unit seizes the idle channel by transmitting an appropriate signal, e.g., a guard tone, over the idle channel and the guard tone is detected by an appropriate one of the signal detectors 60. The central processing unit 54 generates the appropriate switch control signals and supervisory control signals SUPC in response to the detected signal DSC from the mobile unit and effects a connection between an available outgoing trunk OT and the appropriate VOICE (RCV) line 27 through the switching unit 52. Either simultaneously with the seizure of an outgoing trunk or sequentially thereafter, the central processing unit 54 increases the output power level of the transmitter serving the seized idle channel. The mobile unit may thereafter receive an appropriate signal indicating that it is connected to an available outgoing trunk OT and may supply the dialing signals required by the wire line telephone system 22 to effect a connection to the desired wire line telephone system subscriber. A new idle channel may be designated and marked in the zone in which the idle channel was seized as was previously described.

For billing purposes, the central processing unit 54 may detect completed calls and time the duration of all such calls. The time information, together with information identifying the subscriber using the system, may be recorded by the billing and traffic recorders 70. In addition, user density throughout each day or during peak periods may be recorded by the billing and traffic recorder 70 to provide information as to future system requirements.

B. BASE STATION

Figure 4:
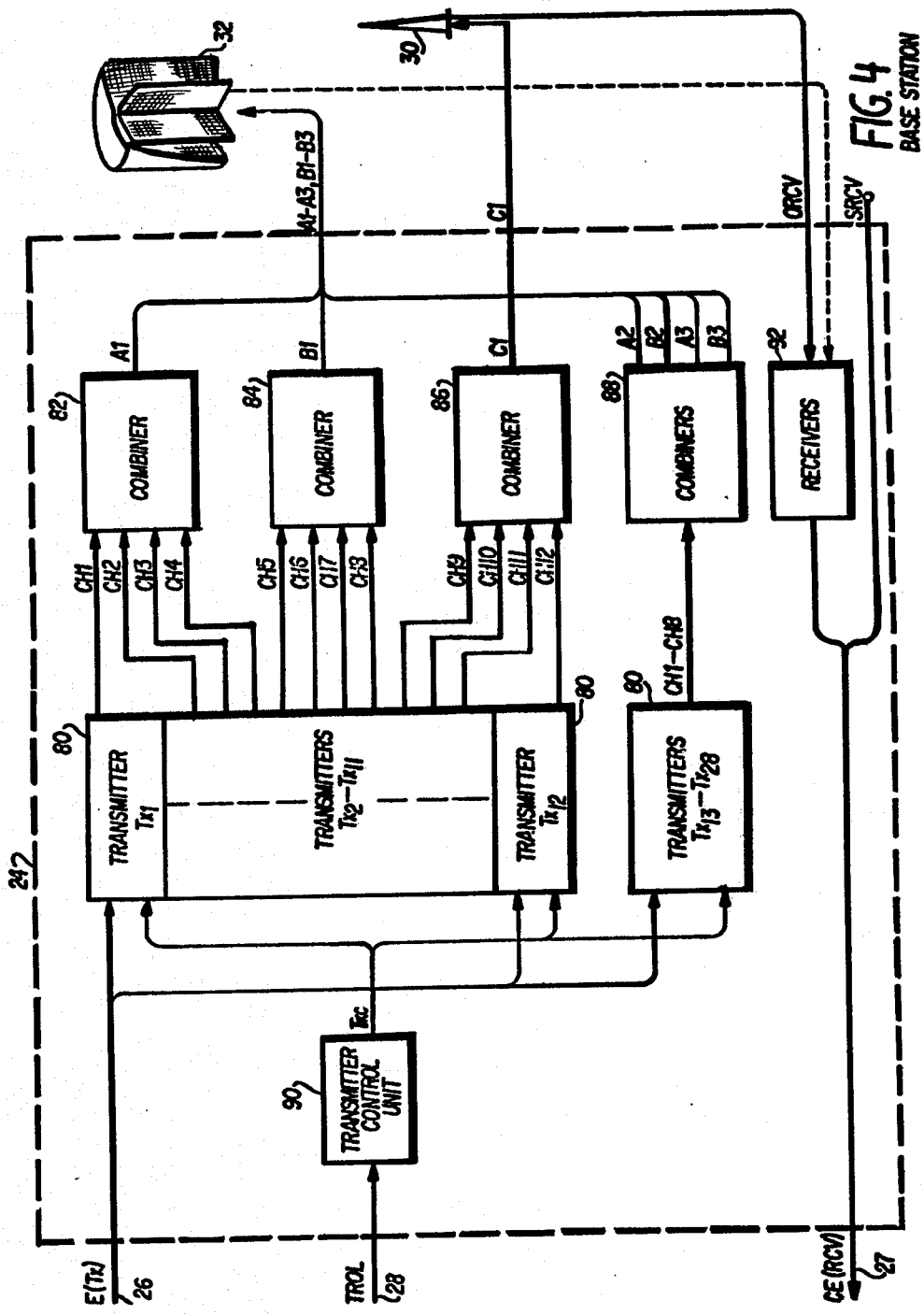
FIG. 4 is a functional block diagram of one embodiment of the base station of FIG. 1.

One embodiment of the base station 24 of FIG. 1 employed in the OSA system is illustrated in greater detail in FIG. 4 to facilitate an understanding of the present invention.

Referring now to FIG. 4, the signals from the central control unit 20 may be applied by way of the two-wire VOICE (TX) transmission lines 26 to the base station 44 for transmission to the mobile units. Each two-wire pair of the VOICE (TX) lines 26 may be connected to an associated one of a plurality of transmitters designated $TX_1$-$TX_{28}$ so that the central processing unit 54 may selectively connect the incoming trunk lines IT and/or the tone generators 56 to each and any one of the transmitters 80 as was previously described in connection with FIG. 3. In a 12-channel system with a fixed channel assignment in each of the sectors A1–A3, B1–B3 and C1, four channels and thus four transmitters 80 may be assigned for transmission in each sector. For example, channels 1–4 (CH1–CH4) may be assigned to zones A1, A2 and A3. Thus, transmitters TX1–TX4 tuned to the respective channels CH1–CH4 may be provided for transmission in zone A1. The signals from the transmitters TC1–TX4 may be combined in any suitable conventional manner by a combiner 82 and applied to the section of the directional antenna array 32 defining and serving the sector A1 to provide transmission over channels CH1–CH4 in sector A1.

Similarly, the voice lines VOICE (TX) for the channels assigned to zone B1 may be connected to the transmitters TX5–TX8 (not shown) which may be tuned to the appropriate ones of the channels 5–8 (CH5–CH8). The output signals from the transmitters TX5–TX8 may be applied to a conventional combiner 84 to provide a combined output signal to the appropriate sector of the directional antenna array 32 for coverage of the zone B1.

In the illustrated fixed channel assignment system of FIG. 4, the channels CH9–CH12 mahy be assigned to the sector C1 surrounding the base station 24 (see FIG. 2). For this purpose, four transmitters TX9–TX12 tuned to the respective channels CH9–CH12 may be provided. The signals from the transmitters TX9–TX12 may be combined through a suitable conventional combiner 86 and the combined output signal from the combiner 86 may be applied to the omnidirectional antenna 30 at the base station 24 for coverage of the sector C1 of the service area 38 of FIG. 2.

The remaining 16 transmitters TX13–TX289 may provide coverage of the zones A2, B2, A3 and B3 in the same manner as described above. For example, the groups of transmitters TX13–TX16 and TX17–TX20 may be tuned to channels CH1–CH4 and may be combined to provide coverage of sectors A2 and A3 via the appropriate section of the directional antenna 32 defining and serving these sectors. Channels CH5–CH8 may likewise be provided within zones B2 andB3 from the groups of transmitters TX21–TX24 and TX25–TX28 via appropriate sections of the directional antenna 32.

The transmitters TX1–TX28 may be any suitable conventional transmitters such as FM transmitters having output power levels of sufficient magnitude to provide wave energy signals of a desired level throughout the sectors served by the transmitters. Of course, at least those transmitters serving the zones A1–A3 and B1–B3 must be variable in output power level between two discrete values in response to the control signals TXC as was previously described and is hereinafter discussed. Further, a third power level (Fo) consisting of an unmodulated carrier at low power, perhaps 0.5w, sufficient to effectively swamp intermods and false marked idle signals, may be radiated from transmitters not in use for calls.

Control of the transmitters 80 may be effected by the CONTROL signals supplied to the base station 24 via the lines 28. The CONTROL signals may be applied to a suitable transmitter control unit 90 including a suitable modem, and various decoded transmitter control signals TXC generated by the transmitter control unit 90 in response to the CONTROL signals may be applied to the transmitters 80. For example, the particular transmitter 80 serving each sector in which the idle chamber marker is being transmitted at any particular time may be controlled by the TXC signal to turn on and transmit at a reduced power level as was previously described. When the idle channel is seized for conversation, the TXC signal may command the appropriate transmitter 80 to increase its output signal power level to the normal communication power level for two-way conversation. At the end of the call, the TXC signal from the transmitter control unit 90 may command the appropriate transmitter 80 to reduce to the power level Fo or to turn off.

Moreover, the TXC signal may include channel assignment signals for effecting a dynamic channel-to-zone assignment in connection with a dynamic or adaptive channel assignment algorithm for systems having remotely tunable (or combinations of fixed and remotely tunable) transmitters and receivers. For fixed channel systems with few channels, a dynamic channel assignment unit such as that illustrated in and described hereinafter with reference to FIG. 5 may be controlled by the TXC signal to adaptively assign channels to the sectors. In the event that dynamic channel assignment is employed, the TXC signal may also be supplied to the system receivers to effect receiver channel changes as channels are dynamically assigned to the various sectors.

To complete the two-way communication path between the mobile units 40 of FIG. 2 and the wire line telephone system 22 of FIG. 1, the signals ORCV detected by the receiving portion of the omnidirectional antenna 30 at the base station 24 may be applied as shown in FIG. 4 to a plurality of receivers 92 corresponding in number to the number of channels assigned to the sectors A1–A3, B1–B3, and zone C1 in the embodiment of FIGS. 1–5. The signals SRCV from the satellite receivers SR1–SR6 of FIGS. 1 and 2 may also be transmitted to the base station 24 in a suitable manner, e.g., over commercially installed transmission lines. In the event that the directional antenna array 32 is employed to receive signals from the mobile units, the signals from each directional antenna segment may be applied to the receivers 92 as is illustrated in phantom. The output signals from the receivers 92 and the signals SRCV from the satellite receivers SR1–SR6 may then be transmitted to the central control unit 22 via the voice grade transmission line VOICE (RCV) for selective application to the appropriate outgoing trunks OT of the wire line telephone system as determined by the central processing unit 54 of FIG. 3.

C. DYNAMIC CHANNEL ASSIGNMENT

As an alternative to fixed channel assignments described in connection with FIG. 4, a dynamic channel assignment technique (also referred to as an adaptive channel assignment technique) may be used where the frequency of the remotely tuned transceivers at the OSA base stations is controlled by the central processor. This allows each transceiver connected to any one of the sectors to be selectively tuned to any one of the authorized frequencies. Thus, channel frequencies may be assigned to any sector simply by a command from the central processor. Further, by providing additional transceivers at each sector, channels may be shifted from sector to sector as needed to accommodate heavier traffic loading in busier sectors by diverting channels from the lightly loaded sectors. An algorithm designed to minimize interference may control the channel assignments.

For example, four channels may be available for use in each of the sectors A1–A3 and B1–B3 and in the central zone C1 of FIG. 2 under uniform user density conditions. Assuming that four mobile units 40 are simultaneously engaged in calls in sector A1, a call cannot be established with another mobile unit in sector A1 since there are no available channels.

The central processor at the control unit 20 may determine that sector A1 is fully loaded, i.e., that there are no more available channels in sector A1, through the number of established connections therethrough to the sector A1 of the base station 24. If a channel is available in one of the other sectors B1–B3 or the central zone C1, this available channel may be temporarily shifted to sector A1 to accommodate the heavier traffic loading in sector A1. Thus, for example, channel 12 may be borrowed from zone C1 and assigned for use in sector A1. A transmitter-receiver pair (e.g., a transceiver) connected to the directional antenna segment defining sector A1 (or connectable thereto) may then be tuned to the channel 12 frequency and channel 12 may become the marked idle channel in sector A1.

In the above example, channel 12 may also be employed in others of the sectors A2, A3, and B1–B3 on a noninterfering basis. However, the use of channel 12 in zone C1 would be proscribed because of potential interference problems. Thus, for example, channel 12 may be assigned for use in sector B3 or in each of the sectors A2 and A3 in addition to sector A1. Sector A1 and any other sectors to which channel 12 is assigned in this manner would then have a five-channel (and five call) capability while zone C1 would have a three-channel (and three call) capability at any one instant.

D. FIXED FREQUENCY DYNAMIC CHANNEL ASSIGNMENT UNIT

Figure 5:
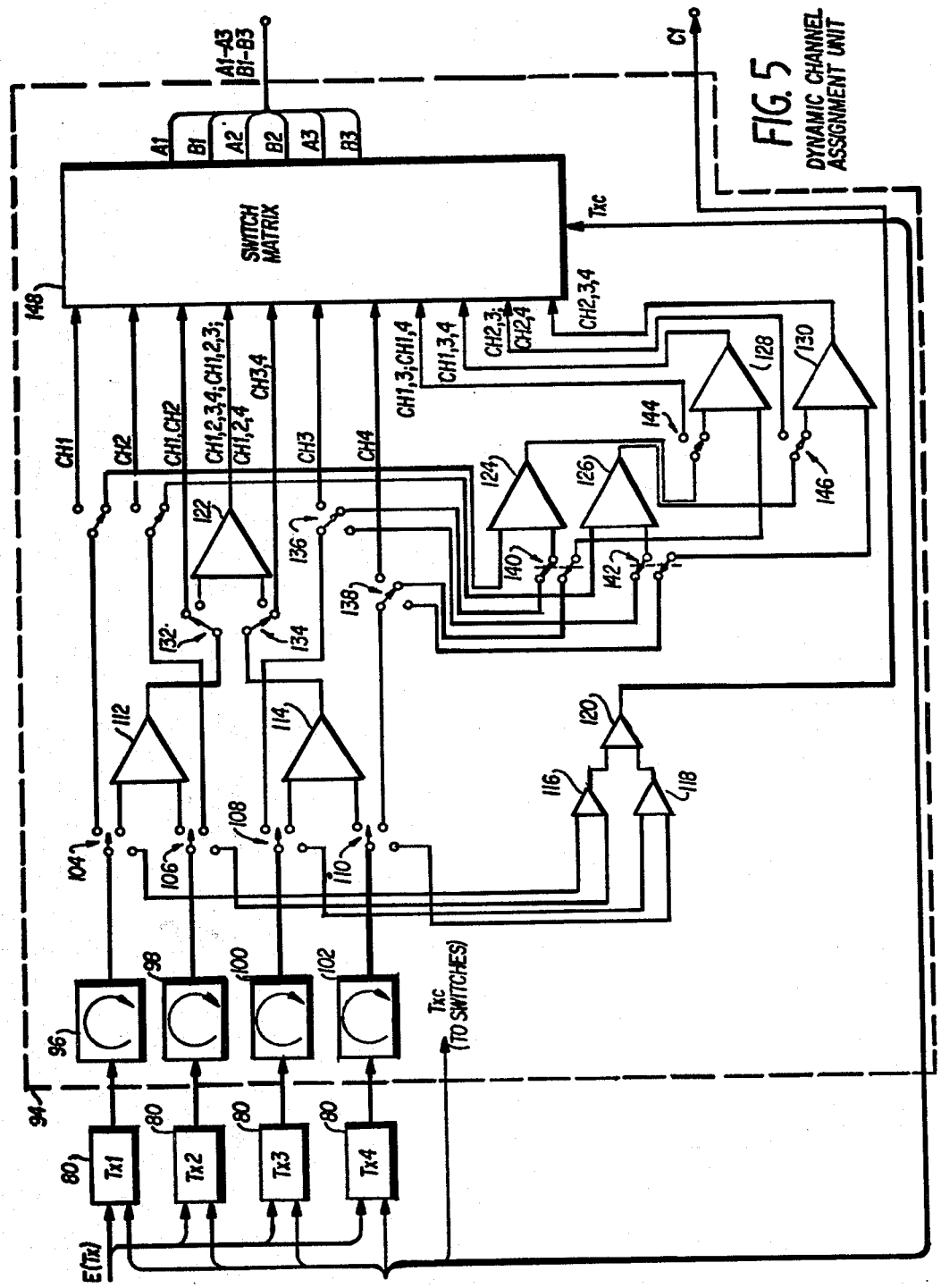
FIG. 5 is a functional block diagram of one embodiment of a dynamic channel assignment unit which may be employed in conjunction with the system of FIG. 1 at the base station of FIG. 4.

In systems where only a few channels are available, e.g., four channels, and the transmitter frequencies are fixed, then alternative methods may be provided to allow communications via the antenna sectors. Such a dynamic channel assignment unit 94, illustrated in FIG. 5, may be utilized in connection with the system of the present invention. Referring now to FIG. 5, there is illustrated a system for combining channels in a four channel system so that all possible combinations are made available for transmission in the various zones. It should be understood that any number of channels may be combined in this manner and selected for transmission within a desired zone in response to the CONTROL signals from the central processing unit 54 of FIG. 3 as decoded by the transmitter control unit 90 of FIG. 4. The illustrated embodiment of FIG. 5 has been limited to four channels only to facilitate an understanding thereof.

As can be seen in FIG. 5, four transmitters TX1–TX4 may be connected to transmit voice and control signals received over the VOICE (TX) lines in response to the transmitter control signals TXC. The transmitters TX1–TX4 may be tuned to transmit at the channel carrier frequencies of channels 1–4, respectively, or may be selectively tunable under the control of the central processing unit 54 of FIG. 3.

The output signals from each of the transmitters TX1–TX4 may be applied through respective directional couplers 96–102 to respective selector switches 104–110. The selector switches 104–110 as well as the other selector switches hereinafter described in connection with the FIG. 5 embodiment of the dynamic channel assignment unit may be any suitable conventional signal controllable mechanical or electronic switches. These switches may be controlled by appropriate decoded control signals TXC from the transmitter control unit 90 of FIG. 4 in response to CONTROL signals from the central control unit 22 of FIGS. 1 and 3.

Each of the selector switches 104–110 is operable in response to the TXC signals and in conjunction with conventional hybrid combiners 112–130 and similar selector switches 132–146 to provide any individual channel or any combination of the four channels at the input terminals of a conventional switch matrix 148. The switch matrix 148 may selectively apply the input signals corresponding to the selected channels or combinations thereof to the appropriate directional antennas as the signals A1–A3 and B1–B3 to serve the correspondingly designated sectors of the mobile telephone service area. The selection of channels by the switch matrix 148 may be controlled by the TXC signals in coordination with the operation of the selector switches 104–110 and 132–146. Moreover, each of the individual channels or combinations thereof may be made available to the omnidirectional antenna as the C1 signal in coordination with the selector switches and switch matrix as is illustrated.

In operation, and assuming that a larger number of transmitters than the four illustrated in FIG. 5 are available for dynamic assignment to the various zones, it may be assumed that where user density is equal in all sectors, A1–A3, B1–B3 and C1, the twelve available channels may be assigned as was previously described in connection with FIG. 4 so that four channels are available in each sector. In the event that only two channels are being utilized in sector C1, e.g., channels CH9 and CH10, and all channels become busy in one of the other sectors, e.g., sector A1, either channel 11 or channel 12 and one or both of the transmitters ordinarily used to transmit over channels 11 and 12 in sector C1 may be switched by the dynamic channel assignment unit 94 of FIG. 5 so as to provide one or more additional communication channels in sector A1. This may also be accomplished by the preferred method of adaptive channel assignment by remotely tuning the transmitters (FIG. 4) with no switching required. During the time in which the channel borrowed from sector C1 is utilized in sector A1, sector C1 may have only two or three available channels and sector A1 may have five or six available channels thereby accommodating variations in user density.

Since all of the information as to which channels in the various zones are busy at any one time is available at the central control unit 22 of FIG. 3, the adaptive assignment of channels to the various zones as user density varies may be accomplished through the transmission of appropriate frequency control signals to the base station in any suitable manner. The only requirement in adaptively assigning channels to the various sectors in this manner is that all assignments be made on a noninterfering basis. In other words, a channel assigned for communication in sector A1 could not be also assigned for communication in sector B1. Similarly, a channel assigned for communication in sector C1 could not ordinarily be assigned for communication in any of the sectors A1–A3 or B1–B3. It can thus be seen that an adaptive or dynamic channel assignment unit of the type exemplified in FIG. 5 may be provided at the base station 24 of FIG. 4 in lieu of the fixed combiners 82–88 to more fully utilize the available channels as user density varies within the sectors of the mobile telephone service area.

II. DESCRIPTION OF ANOTHER SYSTEM EMBODIMENT

As was previously described in connection with FIGS. 1 and 2, one of the available channels in each of the zones A1-A3, B1-B3 and C1 may be designated as the idle channel and marked with an idle channel marker tone. The idle channel information may be broadcast in each zone at a decreased power level by one of the transmitters available for transmission in that zone and when the idle channel is seized the power level of the idle channel transmitter may be increased so that the transmitter may be employed to completely establish and service the call over the seized channel.

Figure 6:
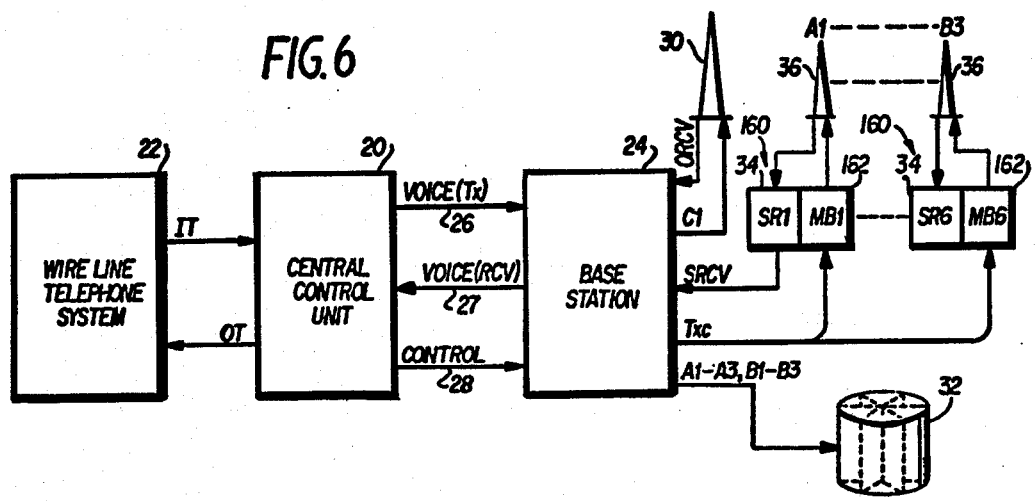
FIG. 6 is a functional block diagram of another embodiment of a mobile telephone system according to the present invention.
Figure 7:
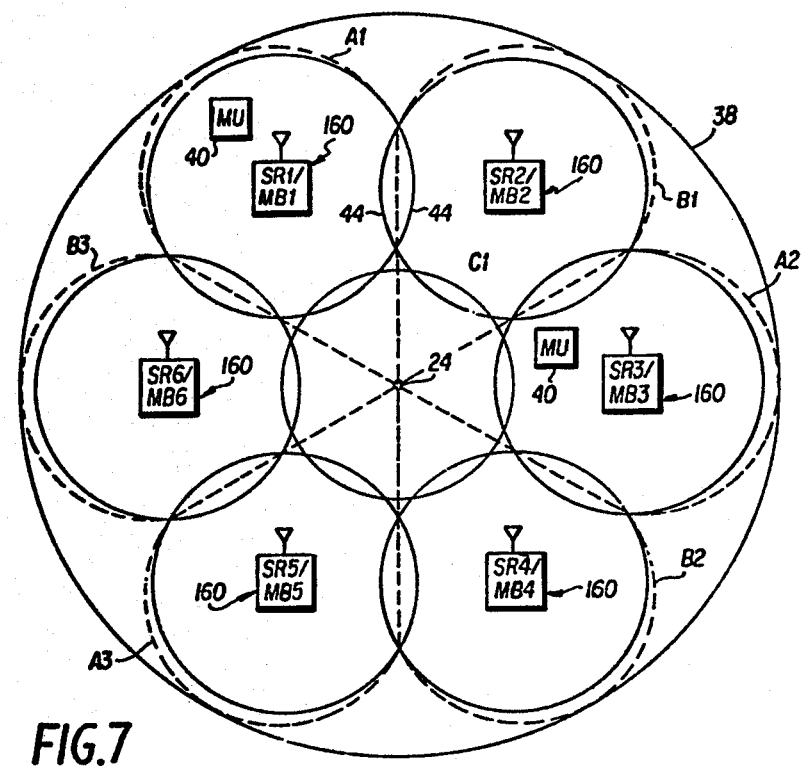
FIG. 7 is a plan view of a mobile telephone service area illustrating the communication coverage pattern of the system of FIG. 6.

In accordance with another embodiment of the invention illustrated in FIGS. 6 and 7 wherein like numerical and letter designations have been utilized to designate elements of the system previously discussed, the marked idle channel may be broadcast from marker beacons provided in each of the zones A1-A3 and B1-B3 as is hereinafter described in detail. Referring now to FIGS. 6 and 7, the central control unit 20 and the base station 24 may operate essentially as was described in connection with FIGS. 1-5 to selectively connect subscribers of the wire line telephone system 22 and at a plurality of satellite stations 160 remote from the base station 24.

Each of the satellite stations 160 may include a plurality of satellite receivers 34 designated SR1-SR6 and previously described in connection with FIGS. 1 and 2. In addition, each of the satellite stations 160 may include one marker beacon transmitter 162 each designated MB1-MB6 to facilitate the description.

The service area or sector C1 in FIG. 7 may be served by the transmitters and receivers connected to the omnidirectional antenna 30 as was previously described in connection with FIGS. 1-5. Transmission from the base station 24 to the mobile units 40 outside the sector C1 may be provided by the transmitters at the base station 24 connected to the various sections of the directional antenna 32 as in the embodiment of FIGS. 1-5. In addition, reception of signals transmitted by the mobile units 40 in the zones A1-A3 and B1-B3 may be provided by the satellite receivers at each of the satellite stations 160 as was previously described in connection with the embodiment of FIGS. 1-5.

However, to minimize marked channel ambiguity between the sectors A1-A3, B1-B3 and C1, the marked idle channels may be established in each of the zones A1-A3 and B1-B3 through the use of the marker beacon transmitters 162. With continued reference to FIG. 6, the control signal CONTROL from the central control unit 20 designating the idle channel to be marked in each of the zones A1-A3 and B1-B3 may be decoded by the base station 24 as was previously described to provide the transmitter control signals TXC. The transmitter control signals TXC may be applied to the marker beacon transmitters 162 and the output signal from each of the transmitters 162 may be applied to a transmitting portion of the antennas 36 at each of the satellite stations 160.

Each of the marker beacon transmitters 162 may be any suitable conventional FM transmitters capable of being remotely tuned in response to an appropriate electrical signal. In a fixed channel assignment system, each marker beacon transmitter 162 need only be capable of being tuned over the range of frequencies of the channels assigned to the zone in which the beacon transmitter is located. In a system employing dynamic channel assignment, the marker beacon transmitters 162 must be tunable over the entire frequency range of the communication channels available for use in the system.

The operation of the system of FIG. 6 may be similar to that of FIG. 1 with the exception of the idle channel marking technique. In accordance with the system of FIGS. 6 and 7, the marker beacon transmitters 162 are tuned to the frequency of an available or idle channel in the zone in which the particular marker beacon transmitter is located in response to the transmitter control signal TXC from the base station 24. When tuned to the appropriate carrier frequency by the TXC signal each marker beacon transmitter 162 may be modulated by the idle channel marker or tone either generated at the satellite station or transmitted thereto and the marker modulated carrier signals from the marker beacon transmitters MB1-MB6 may be broadcast from the respective antennas 36 associated with each satellite station 160.

The antennas 36 are preferably omnidirectional antennas and the propagation pattern of each of the marked carrier signals transmitted from each of the marker beacon transmitters 162 may generally correspond to the relatively circular areas designated 44 in FIG. 7. A mobile unit entering one of the areas 44 (which areas may also generally define the reception pattern of each of the satellite receivers centrally located therein) will search for and lock onto the marked idle channel in that area. The initial communication required for establishing a call either to or from a mobile unit 40 may occur over the marked idle channel and after a marked idle channel has been seized for a call, actual voice communication may occur over the seized marked idle channel by way of the satellite receivers 34 and the transmitters at the base station 24 connected to the directional antenna array 32. In this latter respect, the system of FIG. 6 may operate identically to the system of FIG. 1 after an idle channel has been seized and a call has been established.

As an alternative to signaling over the marked idle channel by way of each of the marker beacon transmitters MB1-MB6 at the satellite stations 160, the initial signaling required for establishing a call may be accomplished by way of the appropriate section of the directional antenna 32 and a transmitter at the base station 24 tuned or tunable to the idle channel. For example, the marker beacon transmitters in each of the sectors A1-A3 and B1-B3 may merely operate to transmit the appropriate marker signals in each of these sectors so that all mobile units are initially tuned to the idle channel available in the sectors in which they are located. When the control unit 20 receives a call for a mobile unit the TXC signal may command each of the marker beacon transmitters to stop transmitting the marker tone. Simultaneously therewith or very shortly thereafter, a seize tone may be placed on the idle channel. The seize tone holds the mobile units on the idle channel and the central control unit 20 may then initiate a call-up sequence over the previously designated and marked idle channel in each of the seven sectors.

When the mobile unit being called receives and decodes the appropriate signal during the call-up sequence, the mobile unit responds and the response is received by a satellite receiver at the satellite station 160 from which the marker signal was previously transmitted to the mobile unit. The marker beacon transmitters in the remaining sectors may then be commanded to transmit the marker signals at the appropriate idle channel frequencies and the established call is serviced by the transmitter-satellite receiver pair which was used for call placement signaling by way of the directional antenna array 32 at the base station 24 and the anetanna 36 at the satellite station 160 servicing the call. If another channel is available in the sector in which the call is established, the central control unit 20 may thereafter command the marker beacon transmitter in that sector to the available channel frequency and command the marker beacon transmitter to transmit the marker signal at that carrier frequency.

In placing a call from a mobile unit to the wire line telephone system 22, a mobile unit locked onto a channel designated idle by the appropriate one of the market beacon transmitters MB1-MB6 in the sectors A1-A3 and B1-B3 or by the appropriate base station transmitter in the sector C1 may transmit a predetermined tone, e.g., a guard tone, indicating that service is requested. The guard tone is received by the satellite receiver at the appropriate satellite station 160 (or by the appropriate receiver at the base station 24 if the mobile unit is in the section C1) and an available transmitter transmits a response to the request for service in the appropriate sector at the marked idle channel frequency either from the appropriate directional antenna section or from the omnidirectional antenna 30. At the same time the marker beacon transmitter in the zone in which service is requested may be commanded by the central control unit 20 to turn off the marker tone and the remaining processing of the call to establish communication with a wire line telephone systems subscriber may be continued as was previously described in connection with FIG. 1. If another channel is available for use in the sector in which the call is established, the central control unit 20 may command the marker beacon in that sector to the frequency of the available channel and the marker signal may be transmitted at that available channel frequency.

III. SERVICE AREA EXPANSION

The growth capability of an OSA system implemented in accordance with the tenchniques of the present invention permits an OSA system to be first used to replace a standard omnidirectional large zone system resulting in up to three times more frequency reuse for the same area coverage. Secondly, large zone OSA base stations can be located closer together than omnidirectional systems with further increase in frequency reuse per area covered. Thirdly, OSA base stations can be located with contiguous coverage patterns throughout an area with co-channel interference minimized by proper orientation of the sectors and assignment of channels to those sectors. Fourthly, base station to base station sector overlap is possible which allows the OSA system technique to provide a multicellular system having greater channel reuse with a superior channel distribution over the service area, requiring fewer base station sites, and less equipment than a small cell system utilizing omnidirectional antennas to cover the equivalent service area.

Figure 8A:
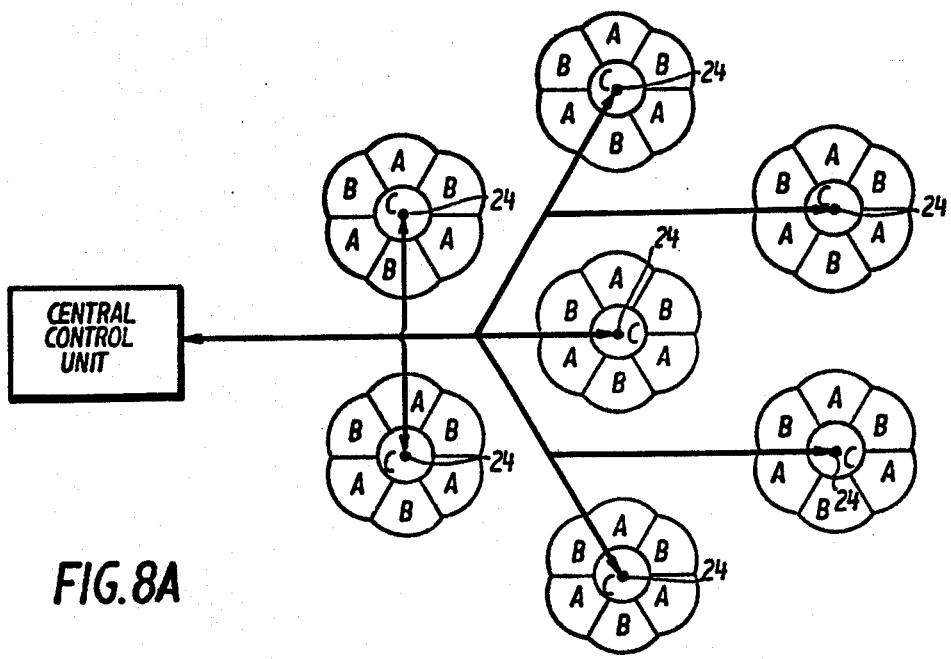

As a first step in employing the OSA techniques of the present invention to replace large zone. omindirectional systems, an OSA base station 24 may be provided generally centrally of each of a plurality of preexisting, separated large zones, as is illustrated in FIG. 8A. The preexisting large zones will typically be separated sufficiently to provide about a 12 dB C/N ratio between any two base stations. The spacing between base stations serving areas approximately 28 miles in diameter will thus be on the order of 42 miles and the central, ominidirectionally served zones C may be approximately 9.3 miles in diameter.

The directional served sectors A and B may be oriented so that sectors served by the same communicating channels do not face one another directly. Thus, an an alternative to placing the base stations 24 at preexisting sites, the base stations 24 may be placed somewhat closer together than is permissible in an omnidirectionally served large zone system. The spacing between base station 24 should be approximately 28 miles in a large zone on the directionally served system.

Figure 8B:
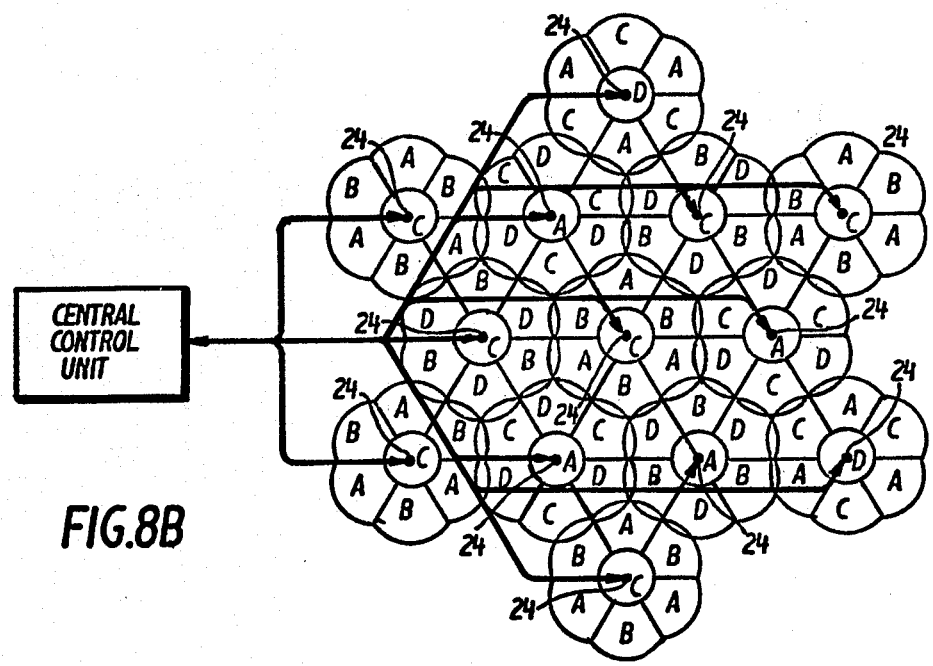

Referring now to FIG. 8B, as mobile telephone communication is required in the areas intermediate the spaced zones of FIG. 8A, OSA base stations 24 may be added as required as illustrated. In FIG. 8B, each of the letters A, B, C, and D indicates a sector served by three communication channels. The sector A served by one of the base stations 24 may employ the same channels as the sector A served by another of the base stations 24. Similarly, the same channels may be employed in like designated sectors through the service area. With the embodiment illustrated in FIG. 8B, the frequency reuse factor is approximately 1.75 times that of large zone ominidirectionally served systems and additionally, 85% more area may be covered.

As will hereinafter become apparent to one skilled in the art to which this invention pertains, the area 38 may be served in a manner which meets present requirements and which permits expansion to meet future needs in a cost effective and orderly manner as is illustrated by the service area coverage patterns of FIGS. 8A, 8B, 8C, 9 and 10.

Figure 8C:
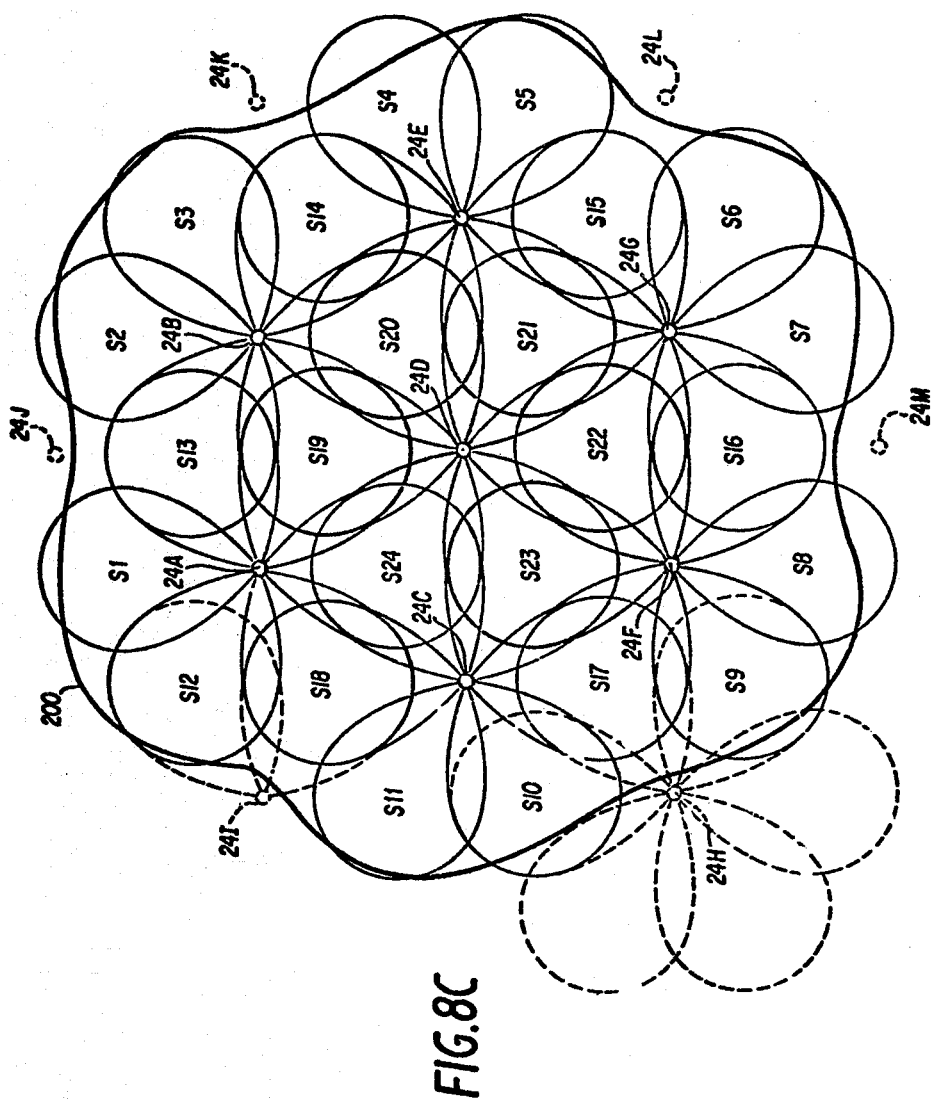

Referring now to FIG. 8C, as a service area grows from one which can be served by a single base station 24A to one requiring additional coverage, additional base stations 24B-24G having overlapping coverage may be provided as illustrated. In the plural base station embodiment illustrated in FIG. 8, the base stations may be spaced approximately equidistantly in such a manner that any three adjacent base stations, e.g., 24A, 24B and 24D, are located at the corners of an equilateral triangle. The directional antennas 32 at each of the base stations 24A-24G are oriented directionally so that each sector of a large geographical service area 200, designated by the alpha-numeric descriptors S1-S24, is served by one or more directional antenna sections and at least some of the sectors are served by two and as many as three directional antenna sections each located at different base stations.

In the illustrated embodiment of FIG. 8C, sectors S1-S12 are each covered by one directional antenna section. The remaining sectors S13-S24 are served by two or more directional antenna sections. Thus, with this arrangement of directional antenna and base stations, at least one-half of the overall service area sectors S1-S24 are served by more than one base station. With arrangements having fewer base stations, a smaller percentage of overlapping coverage may result. However, even with arrangements employing fewer base stations, overlapping sector coverage from plural base stations is provided centrally of the overall service area where increased capacity is typically needed as a system expands.

Assuming that twelve channels are available for use in the mobile telephone system various combinations of channels may be assigned to each of the sectors S1-S24 on a noninterfering basis. One example of a channel assignment scheme may be as follows:

| Sectors | Channels | Base Stations |
|---|---|---|
| S1 | 1, 3 | 24A |
| S2 | 9 | 24B |
| S3 | 12, 1 | 24B |
| S4 | 6, 3 | 24E |
| S5 | 8, 4 | 24E |
| S6 | 3, 11 | 24G |
| S7 | 10, 5 | 24G |
| S8 | 1, 8 | 24F |
| S9 | 9, 11 | 24E |
| S10 | 5, 8 | 24C |
| S11 | 1, 6 | 24C |
| S12 | 11, 10 | 24A |
| S13 | 6, 2 | 24A, 24B |
| S14 | 10, 7 | 24B, 24E |
| S15 | 5, 1 | 24E, 24G |
| S16 | 4, 7 | 24G, 24F |
| S17 | 2, 12 | 24F, 24C |
| S18 | 4, 12 | 24C, 24A |
| S19 | 8, 5, 1 | 24A, 24B, 24D |
| S20 | 3, 4, 11 | 24B, 24D, 24E |
| S21 | 12, 2, 9 | 24D, 24E, 24G |
| S22 | 6, 5, 8 | 24D, 24F, 24G |
| S23 | 11, 3, 10 | 24C, 24D, 24F |
| S24 | 2, 9, 7 | 24A, 24C, 24D |

As can be seen from the above exemplary channel assignment scheme, sector S19 may be served by channel 8 from base station 24A, by channel 5 from base station 24B and by channel 1 from base station 24D. Sectors S20-S24 may also each be served by three channels, one channel from each of the three adjacent base stations at the periphery of each of these sectors. The sectors S13-S18 may each be served by two channels each with the above exemplary channel assignment scheme. Each of the sectors S1-S12 may also be served by two channels but are not served from two different base stations but rather are served by one section of the directional antenna array at a base station with two transmitter-receiver pairs assigned to each of these peripheral sectors S1-S12. Of course, other noninterfering channel assignment schemes may be implemented using the basic base station configuration and directional antenna coverage pattern illustrated in FIG. 8. Thus, in areas of high user density, additional channels may be made available and in areas of lower user density as few as one channel may be made available. Moreover, channels may be assigned to various sectors dynamically as the need arises as was previously described.

To insure effective coverage of the mobile telephone service area 200, omnidirectionally served sectors slightly overlapping the sectors S1-S24 may be provided around each of the base stations 24A-24G. Moreover, marker beacon transmitters and satellite receivers may be provided in each of the sectors S1-S24 to further enhance the operation of the system of FIG. 8C.

Of course, if should be noted that continued growth is readily accommodated in accordance with the invention through the addition of base station equipment at any of the base station sites illustrated in phantom at 24H-24M. For example, the base station 24H may be added as the service area expands outwardly at its periphery. The base station 24H not only provides additional area coverage but also provides additional or back-up coverage in the preexisting sectors S9, S10 and S17. It can readily be seen from the foregoing description of FIG. 8C that the system can be continuously expanded in any direction and as far as required to cover any desired geographical area.

Moreover, if can be seen with reference to FIGS. 2 and 8C that the system of the present invention provides orderly growth from an existing system serving a relatively small area 38 to a large area multiple zone system serving a large area 200 in both an orderly and cost effective manner. For example, as system expansion is required, the required call capacity in outlying or fringe areas will ordinarily be low as compared to the required call capacity at the center of the service area. This may be more readily seen by noting that the center of the service area will typically be a large urban area with high call capacity requirements and as the system expands outwardly into suburban areas, the initial call capacity will ordinarily be much lower than that of the urban area. Moreover, as the suburban area grows around the urban area, increased call capacity is typically required in the urban area. As can be seen from FIG. 8C, each time the system is expanded to provide service in peripheral areas, the installed base station equipment also provides additional call capacity in the existing service area.

Of course, in the event that any of the sectors served by the added base station equipment, e.g., at the base station 24H, is insufficiently served by a single base station, i.e., by nonoverlapping coverage, additional transmitting and receiving equipment may be readily added to the base station 24H to provide more channel availability. As an alternative or an adjunct to the addition of equipment to the existing base station 24H, another base station initially employing only one or two of its available directional antennas may be provided. In this latter respect, only selected ones of the available directional antennas at the base station 24I may be initially used where additional call capacity is required in sectors S12 and S18 and wherein future system growth is contemplated beyond the sectors S12, S18 and S11. It should be noted that this type of orderly system growth cannot be accommodated with known mobile telephone multiple zone systems where only a small number of channels (e.g., 12) are available.

In accordance with another embodiment of the present invention, coverage of a zone or sector from up to six different base stations with overlapping directional antenna-defined sectors may be provided. Referring now to FIG. 9 which illustrates another growth pattern for accommodating service area expansion in an orderly and cost effective manner, the pattern previously described in connection with FIGS. 2 and 7, with the exception of the service area C1, served by the omnidirectional antenna 30 at the base station 34 is illustrated in phantom. In FIGS. 2 and 7, satellite receiving stations were provided in each of the zones A1-A3 and B1-B3 served by the base station 24 so as to serve the geographical area 38. In accordance with the embodiment of the invention illustrated in FIG. 9, orderly growth of the service area 38 may be accommodated by adding transmitters at any one or more of the six satellite receiver stations to form one or more of the additional base stations 24N-24T.

The base stations 24N-24T formed in this manner may accomplish all transmitting and receiving (or at least all transmitting) by way of a directional antenna array as opposed to the omnidirectional receiving antennas previously employed at the satellite stations. As a result, the sector A1 served by the base station 24 serves the area around the base station 24N and the sector N1 served by the base station 24N serves an area around the base station 24. With six base stations 24N–24T located as illustrated, the area around the base station 24 may be served by six sectors N1, P1, Q1, S1 and T1 each associated with a different one of the respective base stations 24N–24T, thus forming one sector SA served by up to six base stations. In addition to serving the area around the base station 24, the base station 24N may also serve new sectors or areas N2 and N3 as well as provide additional call capacity in existing sector B1 through the provision of the sector N4 served by the base station 24N. Satellite receiving stations SRN2 and SRN3 may be provided in the respective peripheral sectors N2 and N3 if omnidirectional receiving is desired.

While transmission to each of the sectors from the base stations is accomplished directionally using directional antenna arrays as was previously described, the receivers in each of the sectors may operate through omnidirectional antennas at each of the base stations 24 and 24N–24T and at the satellite receiving stations SRN2 and SRN3. Moreover, to improve performance by insuring that the mobile units lock onto the channel designated as the idle channel in each of the sectors SA, A1–A3, B1–B3, N2 and N3, an omnidirectional marker beacon transmitting unit may be provided in each of the sectors at or in the vicinity of the base stations 24 and 24N–24T as well as the satellite receiving stations SRN2 and SRN3 as was previously described in connection with FIGS. 6 and 7.

Figure 10:
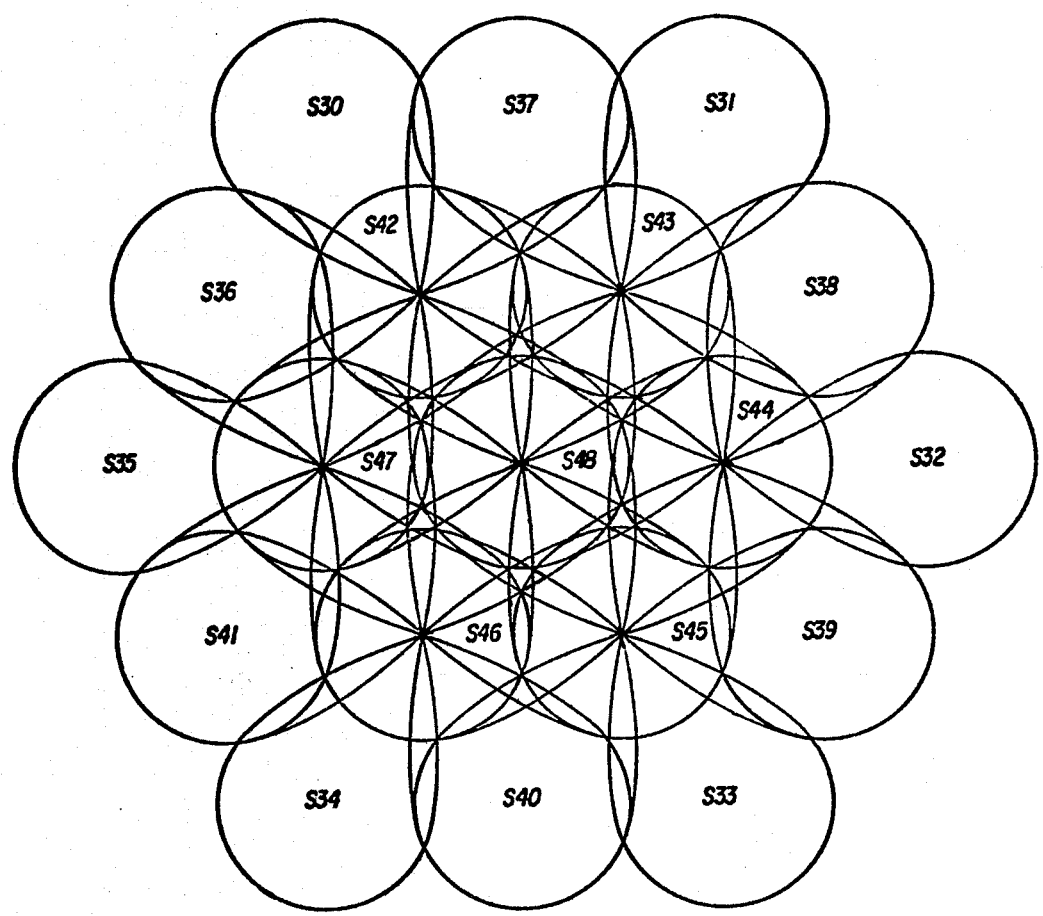

As the system illustrated in FIG. 9 is even further expanded, a service area coverage pattern from the directional antennas at each of the base stations substantially as illustrated in FIG. 10 may result.

Referring to FIG. 10, the sectors designated S30–S35 are each served by one base station and may be assigned one or more channels. The sectors designated S36–S41 are each served by two base stations and may be assigned one or more channels from each of the two base stations. The sectors designated S42–S47 are each served by three base stations and may be assigned one or more channels from each of the three base stations. The central sector S48 is served by six base stations and may be assigned one or more channels from each of the six surrounding base stations.

Additional base stations may be provided generally centrally of one or more of the peripheral sectors S30–S41 to increase the overall geographical size of the system and/or to increase call capacity with existing sectors. The additional base stations may be formed by the addition of transmitting equipment and directional antenna arrays at the satellite receiving stations in the peripheral S30–S41.

As with the embodiment of the expanded system of the present invention illustrated in FIG. 8C, the sectors S30–S48 of the embodiment of FIG. 10 may be assigned channels served by base stations in adjacent sectors in the following exemplary manner:

| Sector | Channels | Base Stations |
|--------|----------|---------------|
| S30 | 2, 4 | S42 |
| S31 | 1, 3 | S43 |
| S32 | 2, 6 | S44 |
| S33 | 1, 5 | S45 |
| S34 | 4, 6 | S46 |
| S35 | 3, 5 | S47 |
| S36 | 6, 1 | S47, S42 |
| S37 | 5, 6 | S42, S43 |
| S38 | 4, 5 | S43, S44 |
| S39 | 3, 4 | S44, S45 |
| S40 | 2, 3 | S45, S46 |
| S41 | 1, 2 | S46, S47 |

-continued

| Sector | Channels | Base Stations |
|--------|----------|---------------|
| S42 | 8, 10, 12 | S43, S47, S48 |
| S43 | 11, 9, 7 | S42, S44, S48 |
| S44 | 12, 10, 8 | S43, S45, S48 |
| S45 | 7, 11, 9 | S44, S46, S48 |
| S46 | 8, 12, 10 | S44, S47, S48 |
| S47 | 7, 9, 11 | S42, S46, S48 |
| S48 | 6, 5, 4, 3, 2, 1 | S42-S47 |

As an example of the operation of the system of FIGS. 9 and 10, the sector S48 of FIG. 10 may be served by channels 1–6 each provided from a different one of the base stations in the sectors S42–S47. Channel 6 may be initially designated the idle channel and the marker beacon transmitter at the base station in sector S48 may transmit the idle marker at the frequency selected for channel 6. Thus, all mobile units entering sector S48 will lock onto the marked idle channel, channel 6.

When the idle channel in S48 is seized to establish a call, transmission of the idle channel marker by the marker beacon transmitter may be discontinued and the transmitter and directional antenna at the base station serving sector S48 on the idle channel may be energized to complete the calling process as was previously described. Thus, in the foregoing example, marked idle channel 6 may be seized and the marker beacon transmitter in sector S48 inhibited. Assuming that channel 6 is served from the base station in sector S42, the call would thereafter be serviced by the base station 42 over channel 6. A new channel, e.g., channel 2, may thereafter be designated as the idle channel to be marked and the marker beacon transmitter in sector S48 may then come back on the air to transmit the idle channel marker at the appropriate frequency.

IV. DIRECTIONAL ANTENNA ARRAY

The directional antenna arrays 32 described briefly in connection with FIGS. 1–10 and utilized in the disclosed embodiments of the invention may be any suitable conventional array of directional antennas oriented to provide the desired sector coverage. For example, one suitable directional antenna array may comprise a plurality of commercially available Yagi antennas having the desired directional characteristics and oriented to provide sector coverage of a service area. Another antenna arrangement may comprise a plurality of corner reflector antennas having the desired directional characteristics and oriented to provide the desired sector coverage.

A directional antenna array utilizing commercially available Yagi antennas for use in the presently available 450 MHz band is illustrated in FIG. 11. Referring to FIG. 11, the directional antenna array 32 employed in conjunction with a six sector pattern such as that of FIGS. 1 and 6 may comprise six Yagi antennas 210 each having an angular beamwidth of about 60° and each secured to an antenna mast 212 at angular intervals approximately equal to the sum of one-half the angular beamwidth of two adjacent antennas 210, i.e., 60° in the embodiment of FIG. 11. The angular beamwidth of each antenna 210 may be defined by the approximate angle between the lines defining the half power points of the antenna pattern or in any other conventional manner.

In the 450 MHz band, the directive gain resulting from each directional antenna 210 with a half power angular beamwidth of 60° will approximate 10 dB above the gain of the dipole. Since high gain is not a requirement and is difficult to achieve in the 150 MHz band within desirable weight and size limitations, a wider beamwidth on the order of 76° and a gain of approximately 7 dB may be utilized in this lower frequency band. With the 76° beamwidth, only five directional antennas oriented 72° apart may be required in a 150 MHz band system.

Moreover, it should be understood that other beamwidths and antenna orientations may be employed depending upon system requirements. For example four 90° beamwidth antennas spaced at 90° intervals about the mast 212 may be employed. In addition, it should be understood that some overlap between the sectors defined by adjacent directional antennas, e.g., the sectors A1 and B1 and A1 and B3 in FIG. 2, will occur and may, in fact, be desirable. As long as this area of overlap is fairly well defined by the directional characteristics of the adjacent directional antennas and the power level of the wave energy broadcast in the area of overlap is significantly below that broadcast centrally of the sectors, the capture characteristics of the mobile unit receivers alleviate any problems.

With the antenna illustrated in FIG. 11, coverage of the sectors A1-A3 and B1-B3 of FIG. 2 may be achieved by orienting the longitudinal axes 214 of each of the Yagi antennas 210 along the longitudinal axes of the respective sectors A1-A3 and B1-B3 with which the antennas are associated. Thus, in the plan view of FIG. 11A, the longitudinal axes of the Yagi antennas 214 coincide with the longitudinal axes of the sectors A1-A3 and B1-B3 in a 60°, six sector pattern provide a full 360 degrees of coverage.

Figure 12:
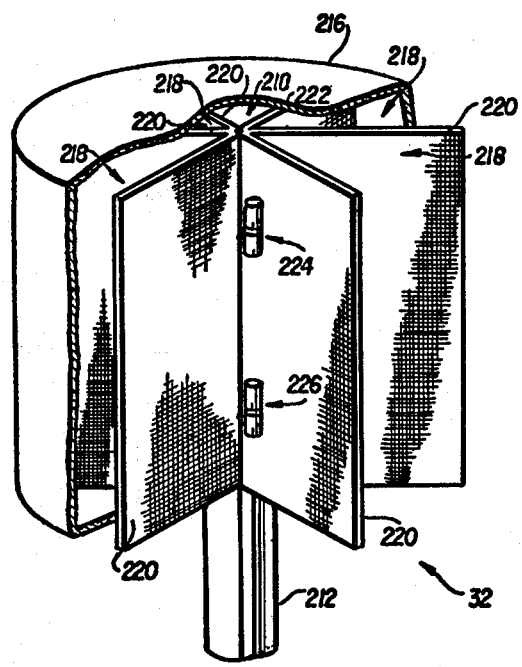

A suitable antenna array 32 comprising several corner reflector antennas is illustrated in FIG. 12. Referring to FIG. 12, the directional antenna array 32 employing corner reflectors may include a vertically disposed, generally cylindrical housing 216 constructed from a suitable electrically nonconductive material such as fiberglass and a plurality of corner reflectors 218 within the housing 216. The corner reflectors 218 may be constructed from a suitable metallic material such as a metal screen and may each present vertically disposed walls or reflectors 220 which intersect along a common axis 222 coaxial with the longitudinal axis of the cylindrical housing. Each adjacent pair of the vertical walls 220 formed by the metal screening material intersect at a predetermined angle determined by the angular bandwidth required to provide coverage at a sector. When used in conjunction with a six sector, 60° coverage pattern such as that illustrated in FIG. 2, the angle of intersection of all of the walls or reflectors 220 may be approximately 60°.

With continued reference to FIG. 12, each of the sectors of the directional antenna array 32 formed by the walls or reflectors may include colinearly disposed dipole antennas, generally indicated at 224 and 226 adjacent the corners thereof. One of the dipole antennas 224 and 226 may be the transmitting antenna and may be connected to the appropriate transmitters at the base station 24 as was previously described in connection with FIGS. 1 and 6. With the colinear dipole arrangement illustrated and with appropriate isolating means therebetween an extremely high degree of isolation, e.g., 50 to 75 dB, exists between the transmitting and receiving antennas.

The size of the antenna array 32 of FIG. 12 will, of course, vary with the frequency band of the system with which the antenna array is employed. For example, at approximately 800-900 MHz, the diameter and length of the housing 216 may each be on the order of one foot. In the 152-162 MHz band, the housing 216 of the antenna array 32 of FIG. 12 may be on the order of seven feet in diameter and three feet in height.

The orientation of the directional antenna array 32 of FIG. 12 in providing coverage of the sectors A1-A3 and B1-B3 of FIG. 2 is illustrated for these sectors in FIG. 11A. As is illustrated in FIG. 11A wherein a view from above the directional antenna array 32 is provided, the walls or reflectors 220 defining each of the sectors may extend upwardly substantially coplanarly with the lines 228 defining the approximate edges of the sectors. It should be noted that under some conditions the corner reflector arrangement of FIG. 12 may be more desirable than the Yagi antenna arrangement of FIG. 11 since the corner reflector arrangement reduces back and side lobes somewhat more than the Yagi arrangement.

V. SECTOR CHANGE TECHNIQUES

As a mobile unit operating within the mobile telephone service is served in accordance with the coverage techniques of the present invention moves from one sector or zone into an adjacent sector, the mobile unit automatically searches for a new idle channel if not engaged in a call. If, however, the mobile unit is engaged in a call as it moves from one sector to another, the established communication path through the base station serving the sector in which the call was established is broken.

When this occurs in large zone systems such as known systems employing IMTS techniques, the call must be reestablished by one of the two parties in order to continue the conversation in the new area (i.e., if mobile telephone service is available in the new area). To minimize the complexity of the system of the present invention, the same approach may be employed as sector changes occur while a mobile unit is engaged in a call. Thus, with reference to FIG. 2, a mobile unit 40 in sector A1 which moves into one of the adjacent sectors B1, B3 or C1 after a call is established would at some point suffer a loss of communication and be required to reestablish the call in the new sector.

If, however, continuity of communication is desired as sector changes occur, the call must be reestablished in the new sector without subscriber intervention. In the system of the present invention previously described in connection with FIGS. 1-7, continuity of communication may be provided as is illustrated in FIG. 13.

Figure 13:
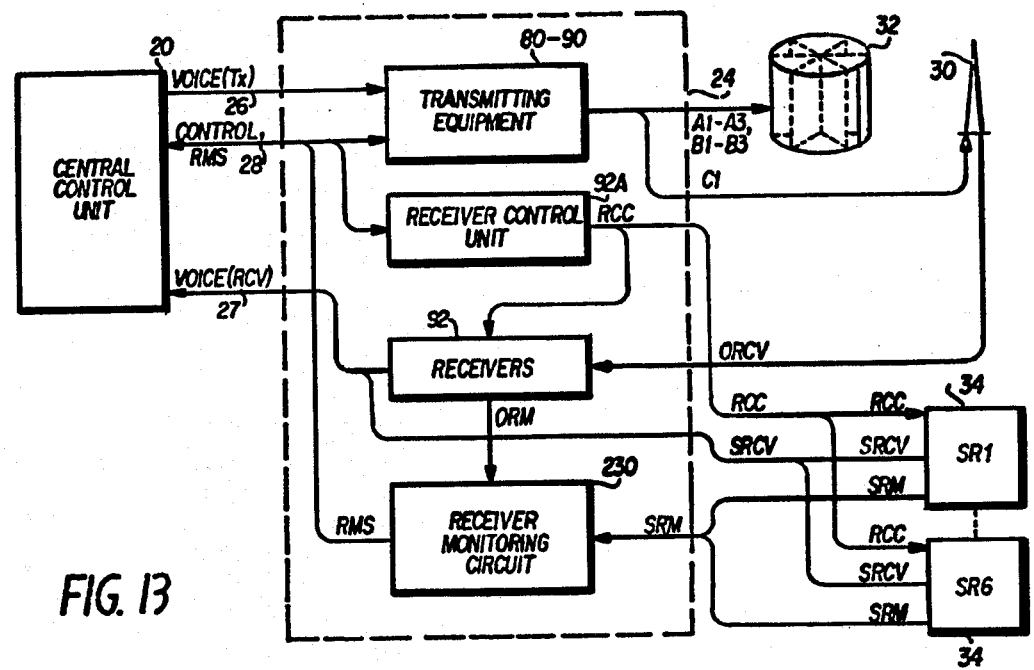
FIG. 13 is a functional block diagram illustrating one embodiment of a base station for accommodating sector change in conjunction with the FIG. 1 and FIG. 6 embodiments of the invention.

Referring now to FIG. 13 wherein previously described elements have been given like numerical designations, each of the receivers associated with the large area coverage pattern of FIG. 2, i.e., the receivers 92 associated with the omnidirectional antenna 30 at the base station 24 and the remote satellite receivers 34, may supply signals ORM and SRM indicative of received signal strength to a receiver monitoring circuit 230 at the base station 24. The receiver monitoring circuit 230 may supply receiver monitoring signals RMS to the central processing unit 54 (FIG. 3) at the central control unit 20 by way of the control signaling lines 28.

The CONTROL signals from the central control unit 20 may be supplied to the transmitting equipment 80-90 at the base station 24 as was previously described in connection with FIG. 4 and may also be applied to a receiver control unit 92A. The receiver control unit 92A may decode the CONTROL signal and provide receiver signals RCC in response thereto. The receiver control signals RCC may be applied to the receivers 92 and to each of the satellite receivers 34 by way of suitable transmission lines.

In operation and with reference to both FIGS. 2 and 13, a mobile unit 40 in a particular sector A1-A3, B1-B3 and C1 will communicate to the central control unit 20 by way of either the receivers 92 associated with the omnidirectional antenna 30, the directional antenna array 32, or by way of the satellite receivers 34. The strength or signal level of the signals received from each mobile unit engaged in a call may be indicated by the ORM and SRM signals which are monitored by the receiver monitoring circuit 230. If the signal level of any of the signals received from mobile units engaged in calls drops below a predetermined threshold level slightly above the minimum level acceptable for conversation (hereinafter referred to as the vote threshold) the receiver monitoring circuit 230 may detect this condition and indicate this condition to the central control unit 20 through an appropriate RMS signal. In addition, the receiver monitoring circuit 230 may indicate to the central control unit 20 the identity of the sector in which the received signals has dropped below the vote threshold as well as the identity of the channel serving the call in that sector. The central control unit 20 may thereafter initiate a vote in adjacent sectors to ascertain into which adjacent sector the mobile unit 40 is moving.

For example, a mobile unit 40 may become engaged in a call in sector A1 of FIG. 2. The mobile unit 40 may thereafter move into sector B3 and the satellite receiver 34 serving the call in sector A1 may experience a drop in level of the signal received from the mobile unit. When the received signal level drops below the vote threshold, the receiver monitoring circuit 230 of FIG. 13 may supply an appropriate RMS signal to the central control unit 20 indicating, for example, that the mobile unit engaged in a call on channel 1 in sector A1 is moving out of sector A1.

When the central control unit 20 receives this information from the receiver monitoring circuit 230, the central control unit may generate appropriate control signals for transmission to the receiver control unit 92A at the base station 24. The CONTROL signals applied to the receiver control unit 92A may be decoded as appropriate receiver control signals RCC and may command an available one of the receivers 92 and 34 in each of the adjacent sectors B1, B3 and C1 to the channel frequency over which the mobile unit is communicating, i.e., channel 1 in the present example. Of course, separate monitoring receivers may be provided and may be tuned to the appropriate channel under the control of the central control unit 20 in this manner. However, use of the available equipment decreases system cost with little or no sacrifice in efficiency since, in the event that no equipment is available in a particular sector to provide the monitoring required for voting, there will be no equipment available in that sector to service the call should the mobile unit be entering that sector.

Continuing with the above example, when each of the three available receivers in the respective sectors B1, B3 and C1 is tuned to the appropriate channel, the receiver monitoring circuit 230 may compare the relative signal levels received by the three receivers to thereby determine the one of the three sectors into which the mobile unit is moving. Alternatively, the receiver monitoring circuit 230 may sample the signal levels of the signals received by the three receivers in the three adjacent sectors and may transmit the sampled signal level information to the central control unit 20 for a determination of the new sector.

After it has been determined that the mobile unit is moving into a particular sector, a channel must be assigned to the established call in that sector to avoid loss of communication. If the mobile unit is an IMTS type unit, the same channel over which the call was initially established must be made available in the new sector if this is possible on a noninterfering basis. The central control unit 20 may make such a determination since information as to the assignment of channels to the various sectors and the currently engaged channels in each sector is available at the central control unit 22. In the previous example wherein the call was established on channel 1 in sector A1 and the mobile unit thereafter moves into sector B3, channel 1 may be utilized in sector B3 if it is not being utilized in sector A3 and if the system is provided with dynamic channel assignment capabilities as was previously described.

Of course, if the mobile units are of the more advanced type capable of being remotely tuned to a different channel, any available channel in the new sector may be assigned to the established call. The assignment of a new channel may be effected by connecting the call from the wire line telephone system through the appropriate transmitting equipment and directional antenna at the base station 24 and by remotely commanding the mobile unit transmitting and receiving equipment to the new channel. Of course, appropriate switching must be accomplished at the central control unit 20 to connect the receiver serving the new channel in the new sector to the appropriate outgoing trunk line.

A directional receiving approach may be utilized to accommodate zone or sector changes in small zone systems such as that disclosed in the previously referenced Wells et al patent and in conjunction with the present invention. Various techniques have been proposed for automatically establishing a new communication path to serve an established call as a mobile unit changes zones in a small zone system. The proposed techniques vary depending upon a number of factors including the type of mobile units being employed in the system. For example, an IMTS mobile unit of the type presently in wide use does not have remotely controllable tuning capabilities. Thus, as an IMTS mobile unit moves from one sector into another when engaged in a call on a particular channel, the same channel must be available for use in the new sector in order to have continuity of communication. On the other hand, a mobile unit which can be remotely commanded to a new channel while engaged in a call can be assigned an available channel in a new sector, whether or not the available channel differs from the channel in use in the old sector. This may be rapidly accomplished without substantial interruption of service by commanding the mobile unit to the available channel as the mobile unit enters the new sector engaged in a call.

Irrespective of the type of mobile unit being utilized in connection with the mobile telephone system, a sector change by a mobile unit engaged in a call must be detected so that either the same channel may be made available in the new sector or a new channel may be assigned to the established call in the new sector. Detection of sector or zone change by a mobile unit may be accomplished as is described in the referenced Wells et al patent or in any suitable conventional manner. Moreover, the directional characteristics of the coverage afforded in accordance with the present invention may be employed to permit the use of a simplified technique for accommodating sector or zone change in conjunction with the previously described embodiments of this invention or with a small zone system such as the Wells et al system.

Figure 14:
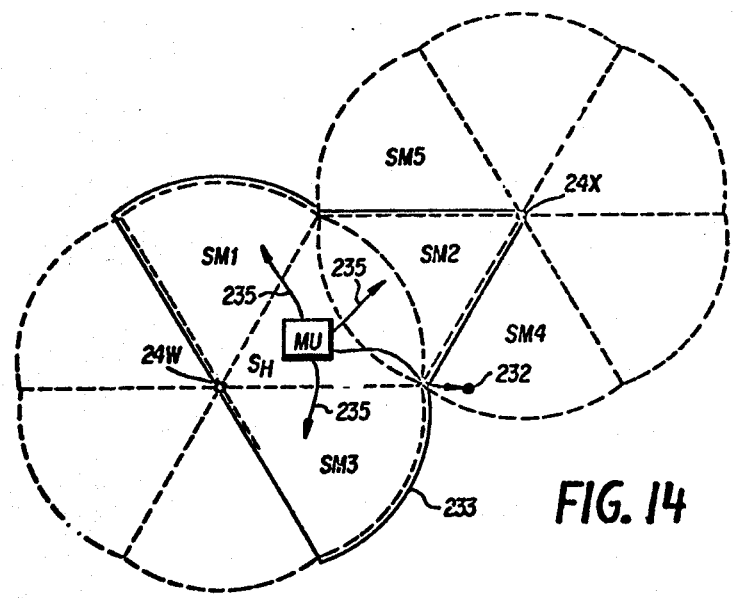
FIG. 14 is a plan view of a mobile telephone service area illustrating one embodiment of a directional approach for accommodating sector change in both known small zone communication systems and in expanded area coverage systems employing directional coverage as in FIGS. 8–10; and, FIGS. 15 and 16 are functional block diagrams illustrating base station equipment which may be employed in the directional antenna approach for accommodating sector change in accordance with the invention.

In FIG. 14, for example, there is illustrated a typical small zone communication system of the type disclosed in the referenced Wells et al patent in which sector change is accommodated through a directional receiving technique. Referring now to FIG. 14, the directional antennas employed in conjunction with the present invention as applied to a small or large zone system separate the small or large zone about each base station 24W and 24X into a plurality of discrete sectors, e.g., six sectors. A mobile unit MU within the communication system may become engaged in a call in a home sector designated $S_H$. As the mobile unit communicates over the channel assigned to the call, transmissions from the mobile unit may be monitored by monitoring equipment at the base station 24W serving the sector $S_H$.

When the signal received from the mobile unit by the monitoring equipment for the sector $S_H$ drops below a predetermined minimum signal level, the central control unit may initiate voting action to determine into which sector the mobile unit is moving. Because of the directional characteristics of the coverage afforded by the directional antenna arrays at each of the base stations 24W and 24X, the sector change determination may be made by monitoring only three sectors. These three sectors designated $S_{M1}$, $S_{M2}$ and $S_{M3}$ in FIG. 14 are those sectors adjacent to and surrounding the home sector $S_H$, i.e., the sectors defining the area 233. In other words, only the two adjacent sectors $S_{M1}$ and $S_{M3}$ served by the base station 24W which serves the home sector $S_H$ and the adjacent sector $S_{M2}$ served by the base station 24X need be monitored to determine into which sector the mobile unit has moved.

For example, if a mobile unit leaves its home sector $S_H$, the most reasonable assumption would be that the mobile unit has entered either sectors $S_{M1}$, $S_{M2}$ or $S_{M3}$ as is generally indicated by the three arrows 235 indicating directions of movement of the mobile unit MU in FIG. 14. As the mobile unit progresses farther from the home sector $S_H$, the receiver at the base station 24W serving the mobile unit in the home sector $S_H$ will indicate a drop in received signal strength below the predetermined minimum, thus indicating a requirement for a vote of receivers serving the sectors $S_{M1}$, $S_{M2}$ and $S_{M3}$. As will hereinafter be described in greater detail, the central control unit may initiate a vote of receivers serving the adjacent and surrounding sectors $S_{M1}$-$S_{M3}$ by tuning these receivers to the channel serving the call. The relative signal strengths of the signals received over the channel serving the call may be compared and the call may be assigned to a channel in that sector in which the strongest received signal is detected.

Assuming, for example, that a vote is initiated by the central control unit in response to a drop in received signal level below the vote threshold level in home sector $S_H$, and further that the received signal in the adjacent and surrounding sectors $S_{M1}$-$S_{M3}$ is strongest in sector $S_{M2}$. Available equipment at the base station 24X serving the sector $S_{M2}$ may be assigned to service the call previously established between the mobile unit and another subscriber in the home sector $S_H$. The sector $S_{M2}$ may thereafter be designated a new home sector for the mobile unit.

Of course, in initiating the previously described voting action, the mobile unit may have traveled along a path generally corresponding to borders between the adjacent and surrounding sectors $S_{M1}$-$S_{M3}$ to a point 232 in a sector adjacent the sector $S_{M2}$. In this situation, the vote of the adjacent and surrounding sectors $S_{M1}$-$S_{M3}$ may result in the designation of the sector $S_{M2}$ as the new home sector and, instead of getting stronger, the signal received in the new home sector $S_{M2}$ may actually get weaker and initiate a sector change request, i.e., a request for a vote of the three sectors adjacent and surrounding the new home sector $S_{M2}$. Again, the normal three vote sequence will occur and since the point 232 toward which the mobile unit has traveled is in one of the sectors $S_{M4}$, $S_{M5}$ and $S_H$ adjacent and surrounding the new home sector $S_{M2}$, the adjacent sector $S_{M4}$ will be designated the new home sector as a result of the vote.

It can thus be seen that the three-sector vote described above can accommodate sector changes along any line from the home sector to or through the adjacent and surrounding sectors. In the event that the assignment of a new home sector is in error due to borderline movement of the mobile unit, the immediate occurrence of a new three-sector vote in the sectors adjacent and surrounding the new home sector automatically corrects for the mistake.

The actual monitoring of signal level by the home sector (to initiate a vote) and by the adjacent and surrounding sectors (to determine a new home sector) may be accomplished in accordance with the monitoring techniques described in detail in the referenced Wells et al application. For example, the monitoring function in the home sector (vote initiation) may be provided by the receiver serving the established call since established calls to the mobile unit MU may be served directionally by way of the directional antennas at the base stations in either known small zone systems or in the previously described embodiments of this invention. The monitoring function for determination of the new home sector may be provided by available receiving equipment at each base station, i.e., receiving equipment not in use for handling a call, or by separate monitoring receivers. If available receiving equipment is employed, the receivers must be selectively tunable. Moreover, if the directional antenna arrangements at the base stations are employed in a small zone or other system solely for zone change determinations, one or more separate monitoring receivers may be provided at each base station to provide all monitoring functions.

Figure 15:
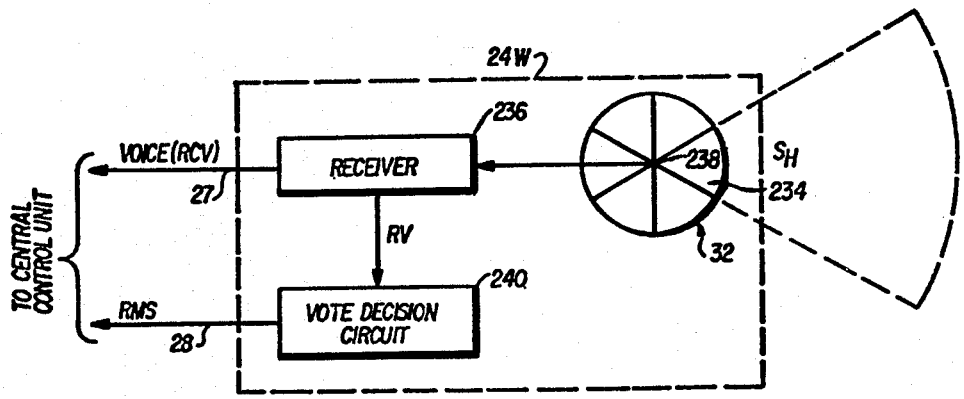

Referring to FIG. 15, for example, the section 234 of the directional antenna array 32 at the base station 24W may serve the home sector $S_H$ of FIG. 13. The receiver 236 receiving transmissions from the mobile unit MY by way of a receiving portion 238 of the directional antenna section 234 may supply a signal RV indicative of received signal strength to a vote decision circuit 240 for determination of a vote requirement. The vote decision circuit 240 may supply a signal VOTE to the central control unit 20 of FIG. 1 on the control signaling lines 28 to initiate a vote.

If the receiver 236 is part of the communication link between the mobile unit and the wire line telephone system, the signal received from the mobile unit may be supplied to the central control unit 20 by way of the VOICE (RCV) lines 27 previously described in connection with FIG. 1. If normal call reception is not accomplished by way of the directional antenna array 32, the receiver 236 may be a monitoring receiver which scans each channel in each of the sectors served by the base station 24W to detect requirements for voting, i.e., to detect the sector change requirements.

The vote decision circuit 240 indicate to the central control unit 20 that a mobile unit engaged in a call on a particular channel in the home sector $S_H$ requires a sector change and the central control unit 20 may then initiate a vote in the sectors adjacent and surrounding the home sector $S_H$. One technique for voting in the adjacent and surrounding sectors and thereby establishing a new home sector is illustrated in FIG. 16.

Figure 16:
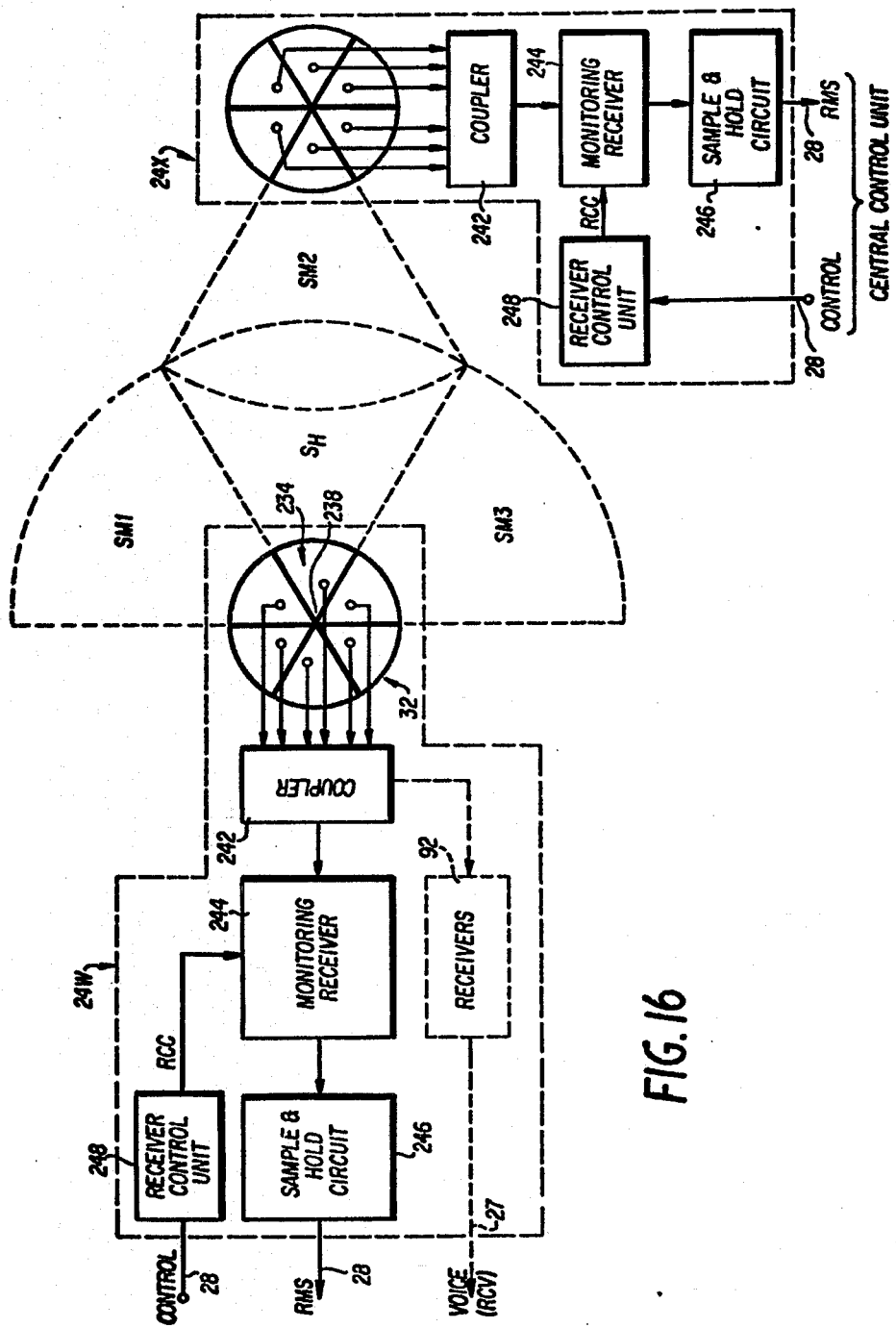

Referring now to FIG. 16, the signals received by each segment of each of the directional antenna arrays 32 at the base stations 24W and 24X may be applied to a suitable conventional RF coupler or combiner 242 and an output signal from the coupler may be applied to a monitoring receiver 244 at each base station. The output signal from each of the monitoring receivers 244 may be applied to a suitable conventional sample and hold circuit 246 and the receiver monitoring signals RMS indicative of monitored signal strength may be applied from the sample and hold circuit 246 to the central processing unit at the central control unit 20 over the signaling lines 28 as was previously described in connection with FIG. 13.

The CONTROL signal from the central control unit 20 of FIG. 13 may be applied to a suitable receiver control unit 248 at each of the base stations and a receiver control signal RCC from each receiver control unit 248 may be applied to each associated monitoring receiver 244. If established calls are to be served by way of the directional antenna array 32 both on the receiving and transmitting communication links, the coupler 242 may be replaced by or may additionally function as a suitable conventional signal splitter so that the signals received by the directional antenna array 32 may be coupled both to the monitoring receiver 244 and to the receivers 92 which serve the communication link from the mobile units as is illustrated in phantom at the base station 24W in FIG. 16.

In operation, the central control unit 20 of FIG. 13 initiates a vote in response to the detection of a drop in signal level below the vote threshold as was previously described. The central control unit may transmit the appropriate CONTROL signal to the receiver control unit 248 at each of the base stations affected by the vote request. The monitoring receivers 244 at the affected base stations may be tuned to the appropriate channel by the receiver control signal RCC from the control unit 248 and then sequentially connected to the directional antennas serving the sectors adjacent to and surrounding the home sector in which the vote request is received. In FIG. 16, for example, the home sector $S_H$ is adjacent to and surrounded by sectors $S_{M1}$, $S_{M2}$ and $S_{M3}$. The monitoring receiver 244 at the base station 24W may thus be tuned to the appropriate channel serving the established call which initiated the vote in the home sector $S_H$ and then would be sequentially coupled to the directional antennas serving the sectors $S_{M1}$ and $S_{M3}$. Similarly, the receiver control unit 248 at the base station 24X may tune the monitoring receiver 244 to this same channel and connect the monitoring receiver 244 to the directional antenna serving the sector $S_{M2}$.

The signal indicative of the received signal level in each of the adjacent and surrounding sectors $S_{M1}$-$S_{M3}$ is sampled and held for a predetermined, relatively short period of time by the sample and hold circuit 246 and transmitted to the central control unit 20 as the RMS signal. The relative signal levels received in the adjacent and surrounding sectors $S_{M1}$-$S_{M3}$ are compared and the largest signal indicates the new home sector. If available, a channel is thereafter assigned in the new home sector to the established call as was previously described.

SUMMARY OF ADVANTAGES AND SCOPE OF THE INVENTION

It can be seen from the foregoing that the method and system of the present invention as embodied in a mobile telephone system provides numerous advantages over known mobile telephone communications systems. For example, the various service area coverage techniques of the invention greatly enhance, by effective frequency re-use, the capacity of existing large zone systems and are readily expandable to accommodate system growth. Expansion of the service area in accordance with the present invention is both orderly and cost effective as can be readily seen from the foregoing description.

The system of the present invention as embodied herein is also extremely advantageous in that it is compatible with existing mobile telephone equipment and may readily take advantage of certain desirable features of more advanced mobile telephone equipment. For example, the system may operate on the basis of IMTS idle channel marking techniques or may be readily modified through the addition of a minimum of hardware to accommodate designated control channel operation of the type disclosed in the previously referenced Wells et al patent. Moreover, the system of the present invention may be readily adapted to either fixed channel assignment techniques or dynamic channel assignment techniques with relative ease.

Further in accordance with the present invention, less reliance is placed upon the directivity of directional antennas employed to serve sectors of a service area. Problems such as back radiation and the additional problem of rapid sector changes in the vicinity of the directional antennas are minimized through the use of a combination of omnidirectional and directional coverage sectors. Moreover, the sectionalizing of a service area is further enhanced in accordance with the present invention through the use of idle channel marking techniques which minimize ambiguity between sectors. The idle channel marking techniques disclosed herein are further advantageous since these techniques are applicable to advanced mobile telephone systems in which calls are established over designated control channels rather than through the IMTS idle channel technique.

The conversion of a large zone or service area mobile telephone system into a sectorized system in accordance with this invention permits reuse of channels within the original area and increases service with a minimum of interference. The initial conversion may be made with a minimum of additional hardware and growth may be accommodated with relatively little additional equipment. As to the ultimate results obtained with the two systems, with 20% blocking and 90 users per Erlang, the directional technique of the present invention can service 1.57 times the number of users capable of being accommodated in an omnidirectionally served system and quite importantly can also handle 16 more simultaneous calls (28 as opposed to 12), representing a frequency reuse of 2.3 to 1.

The provision of a small omnidirectionally served area in the vicinity of the base station in accordance with one embodiment of the invention permits the reuse of the channels employed in the small omnidirectionally served area in relatively close, surrounding service areas with less chance of interference. In addition, the marker beacon transmitting aspect of the present invention provides a unique method of geographically grouping the mobile units operating in the system relative to the proper service sectors with a minimum of ambiguity.

The directional antenna approach to providing continuity of communication as a mobile unit engaged in a call moves throughout a service area is particularly advantageous either in conjunction with known small zone systems or the service area coverage techniques of the present invention. For example, the directional monitoring of changes in location of a mobile unit permits the use of a three-sector voting technique to determine the location of a mobile unit.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a mobile telephone communication system having a plurality of frequency communication channels assigned thereto, and a service area comprising both a service zone essentially centrally located therein and a plurality of remote mobile service zones, apparatus for providing service from the central zone to mobile units throughout the entire mobile telephone service area comprising:

a plurality of transmitters and receivers, a plurality of essentially co-located directional antennas within said central zone, each of said plurality of antennas being connected to at least one of said plurality of transmitters and receivers and each oriented to broadcast and receive wave energy in a different predetermined sector of the service area extending radially beyond said central zone, thereby creating the plurality of remote mobile service zones, and an omnidirectional antenna within said central zone, said antenna being connected to one of said plurality of transmitters and receivers to omnidirectionally broadcast and receive wave energy from said one of said plurality of transmitters and receivers within said central zone.

2. The apparatus of claim 1 including a plurality of satellite receivers remote from said central zone, each located centrally of one of said sectors of said service area.

3. The apparatus of claim 1 wherein said sectors are defined by the directional characteristics of said directional antennas; and, wherein immediately adjacent of said sectors overlap in area by an amount less than the area of any one of said sectors.

4. The apparatus of claim 1 including a plurality of beacon transmitters radially remote from said central zone, at least one of said beacon transmitters being located approximately centrally of each of said sectors beyond said central zone and including means to omnidirectionally broadcast wave energy; and, means associated with each of said beacon transmitters for modulating the wave energy broadcast thereby with a marker signal.

5. The apparatus of claim 4 including a plurality of satellite receivers remote from said central zone, each of said satellite receivers being located centrally of one of said sectors of said service area.

6. The apparatus of claim 5 wherein said sectors are defined by the directional characteristics of said directional antennas; and, wherein immediately adjacent of said sectors overlap in area by an amount less than the area of any one of said sectors.

7. The apparatus of claim wherein the output power level of each of said transmitters connected to said directional antennas is selectively controllable, and further including:

means for generating an idle channel marker signal;

means for generating a control signal; and, circuit means for selectively applying said idle channel marker signal and said control signal to said transmitters connected to said directional antennas, said idle channel marker signal modulating said wave energy transmitted in said sectors and said control signal reducing the output power level of said transmitters from a first predetermined level to a second predetermined level during the modulation of said wave energy by said idle channel marker signal.

8. The apparatus of claim 7 including a plurality of satellite receivers remote from said central zone, each located centrally of one of said sectors of said service area.

9. The apparatus of claim 8 wherein said sectors are defined by the directional characteristics of said directional antennas; and, wherein immediately adjacent of said sectors overlap in area by an amount less than the area of any one of said sectors.

10. The apparatus of claim 1 wherein said directional antennas are located centrally of said central zone, each directional antenna having a directional characteristic including an angular beamwidth defining one of said predetermined sectors of the service area, the sum of the angular beamwidths of said directional antennas being at least 360°.

11. The apparatus of claim 10 wherein adjacent of said directional antennas are oriented angularly relative to each other by an angle approximately equal to the sum of one-half of each angular beamwidth thereof.

12. The apparatus of claim 10 wherein immediately adjacent of said sectors are served by different ones of the communication channels assigned to the system, the same communication channels serving at least some of the sectors spaced by at least one other sector whereby the same communication channel may be simultaneously used in more than one sector of the service area.

13. The apparatus of claim 12 including a plurality of satellite receivers remote from said central zone, each located centrally of one of said sectors of said service area.

14. The apparatus of claim 13 including a plurality of beacon transmitters radially remote from said central zone, at least one of said beacon transmitters being located approximately centrally of each of said sectors beyond said central zone and operable to omnidirectionally broadcast wave energy; and,
  means associated with each of said beacon transmitters for modulating the wave energy broadcast thereby with a marker signal.

15. The apparatus of claim 13 wherein the output power level of each of said transmitters connected to said directional antennas is selectively controllable, and further including:
  means for generating an idle channel marker signal;
  means for generating a control signal; and,
  circuit means for selectively applying said idle channel marker signal and said control signal to said transmitters connected to said directional antennas, said idle channel marker signal modulating said wave energy transmitted in said sectors and said control signal reducing the output power level of said transmitters from a first predetermined level to a second predetermined level during the modulation of said wave energy by said idle channel marker signal.

16. A mobile telephone system comprising:
  a plurality of directional antennas each oriented to transmit a wave energy carrier signal in a sector of a service area;
  a plurality of transmitters each connected to a different one of said plurality of directional antennas and each selectively controllable in output power level and frequency to broadcast a carrier signal at different frequencies in immediately adjacent sectors;
  means for generating an idle channel marker signal;
  means for generating a control signal; and,
  circuit means for selectively applying said control signal and said idle channel marker signal to said plurality of transmitters, said idle channel marker signal modulating said carrier signal from each of said transmitters and said control signal controlling the output power level of said transmitters at a first predetermined level to a second predetermined level during the modulation of said carrier signals by said idle channel marker signal, said first predetermined level being substantially reduced relative to a second predetermined level normally employed for communicating after a call is established.

17. The system of claim 16 including a plurality of satellite receivers remote from said directional antennas, at least one of said satellite receivers being located centrally of each of said sectors of said service area served by said directional antennas in order to receive signals from mobile units operating in the sectors.

18. The system of claim 16 wherein said directional antennas are located centrally of the service area, each directional antenna having a directional characteristic including an angular beamwidth defining one of said sectors of the service area, the sum of the angular beamwidths of said directional antennas being at least 360°.

19. The system of claim 18 including a plurality of satellite receivers radially remote from said directional antennas, at least one of said satellite receivers being located centrally of each of said sectors of said service area served by said directional antennas.

20. A mobile telephone system comprising:
  a plurality of transmitters;
  a plurality of essentially co-located directional antennas each connected to at least one of said plurality of transmitters and each oriented to broadcast wave energy from said transmitters in a different sector of a service area;
  a source of an idle channel marker signal; and,
  a plurality of beacon transmitters, at least one of said beacon transmitters being positioned centrally with respect to each of said sectors of said service area, each of said beacon transmitters including means for omnidirectionally broadcasting wave energy modulated by said marker signal in the sector in which positioned.

21. The system of claim 20 including a plurality of satellite receivers remote from said directional antennas, at least one of said satellite receivers being located centrally of each of said sectors of said service area served by said directional antennas in order to receive signals from mobile units operating in the sectors.

22. The system of claim 20 wherein said directional antennas are located centrally of the service area, each directional antenna having a directional characteristic including an angular beamwidth defining one of said sectors of the service area, the sum of the angular beamwidths of said directional antennas being at least 360°.

23. The system of claim 22 including a plurality of satellite receivers remote from said directional antennas, at least one of said satellite receivers being located centrally of each of said sectors of said service area served by said directional antennas in order to receive signals from mobile units operating in the sectors.

24. In a mobile telephone communication system, a system for providing broadcast coverage of a mobile telephone service area comprising:
  first, second and third base stations each including a plurality of transmitters, each of the base stations being spaced approximately equidistantly from each of the other base stations; and,
  a plurality of directional antennas at each of said base stations, each directional antenna at each base station being connected to at least one of said plurality of transmitters directionally to broadcast wave energy in a sector of the service area, one of said plurality of directional antennas at each base station being operable to broadcast wave energy in substantially the same sector of the service area to thereby provide broadcast coverage of said same sector from each of said first, second and third base stations, the remaining ones of said plurality of directional antennas at each of the base stations being oriented to provide broadcast coverage of other sectors of the service area from each of said first, second and third base stations.

25. The system of claim 24 including:
  a fourth base station including a plurality of transmitters, said fourth base station being spaced approximately equidistantly from each of said first, second and third base stations and generally centrally of said same sector covered from each of said first, second and third base stations; and, a plurality of directional antennas at said fourth base station each operatively associated with at least one of said plurality of transmitters to each broadcast wave energy in a sector of the service area, the directional antennas at said fourth base station being oriented to provide broadcast coverage of sectors surrounding said first, second and third base stations.

26. The system of claim 25 including:

fifth, sixth and seventh base stations each including a plurality of transmitters and each being equidistantly spaced radially outwardly from said fourth base station and two of said first, second and third base stations, a plurality of directional antennas at each of said fifth, sixth and seventh base stations, each directional antenna at each of said fifth, sixth and seventh base stations being connected to at least one of said plurality of transmitters thereat to broadcast wave energy in a sector of the service area, one of said plurality of directional antennas at each of said fifth, sixth and seventh base stations being operable to broadcast wave energy in said same sector of the service area covered by said first, second and third base stations to thereby provide coverage of said same sector from each of said first, second, third, fifth, sixth and seventh base stations.

27. The system of claim 26 including:

a marker beacon transmitter located generally centrally of said same sector of the service area covered from said first, second, third, fifth, sixth and seventh base stations, said marker beacon transmitter including means to omnidirectionally broadcast wave energy in said same sector at a selected one of a plurality of predetermined frequencies; and, means for modulating the wave energy broadcast by said marker beacon transmitter with a marker signal.

28. The system of claim 27 including a plurality of satellite receivers located generally centrally of said same sector for receiving transmissions from mobile telephones in said same sector.

29. The system of claim 28 including a central control unit connected to each of said base stations, said satellite receivers, said marker beacon transmitter and to a wire line telephone system for selectively controlling the broadcast of wave energy by said base stations and marker beacon transmitter and for selectively connecting said satellite receivers and said transmitters at said base stations to said wire line telephone system.

30. The system of claim 24 wherein said same sector of the service area is covered from each of said first, second and third base stations at different frequencies whereby at least three transmitters each at a different base station can simultaneously broadcast in said same sector.

31. The system of claim 30 including:

a fourth base station including a plurality of transmitters, said fourth base station being spaced approximately equidistantly from each of said first, second and third base stations and generally centrally of said same sector covered from each of said first, second and third base stations; and, a plurality of directional antennas at said fourth base station each connected to at least one of said plurality of transmitters to each broadcast wave energy in a sector of the service area, the directional antennas at said fourth base station being oriented to provide broadcast coverage of sectors surrounding said first, second and third base stations.

32. The system of claim 31 including:

fifth, sixth and seventh base stations each including a plurality of transmitters and each being equidistantly spaced radially outwardly from said fourth base station and two of said first, second and third base stations, a plurality of directional antennas at each of said fifth, sixth and seventh base stations, each directional antenna at each of said fifth, sixth and seventh base stations being connected to at least one of said plurality of transmitters thereat to broadcast wave energy in a sector of the service area, one of said plurality of directional antennas at each of said fifth, sixth and seventh base stations broadcasting wave energy in said same sector of the service area covered by said first, second and third base stations, said wave energy being broadcast by said fifth, sixth and seventh base stations in said same sector at frequencies differing from each other and from the frequencies of the wave energy broadcast from said first, second and third base stations to thereby provide coverage of said same sector from each of said first, second, third, fifth, sixth and seventh base stations at six different frequencies.

33. The system of claim 24 including an omnidirectional antenna at each of said first, second and third base stations, each omnidirectional antenna being connected to at least one of said plurality of transmitters at said base stations to broadcast wave energy in a zone surrounding each base station and overlapping a portion of said same sector covered from each of said base stations.

34. The system of claim 33 including:

a marker beacon transmitter located generally centrally of said same sector of the service area covered from said first, second and third base stations, said marker beacon transmitter including means to omnidirectionally broadcast wave energy in said same sector at a selected one of a plurality of predetermined frequencies; and, means for modulating the wave energy broadcast by said marker beacon transmitter with a marker signal.

35. The system of claim 34 including a plurality of satellite receivers located generally centrally of said same sector for receiving transmissions from mobile telephones in said same sector.

36. The system of claim 35 including a central control unit connected to each of said base stations, said satellite receivers, said marker beacon transmitter and to a wire line telephone system for selectively controlling the broadcast of wave energy by said base stations and marker beacon transmitter and for selectively connecting said satellite receivers and said transmitters at said base stations to said wire line telephone system.

37. The system of claim 24 including:

a marker beacon transmitter located generally centrally of said same sector of the service area covered from said first, second and third base stations, said marker beacon transmitter including means to omnidirectionally broadcast wave energy in said same sector at a selected one of a plurality of predetermined frequencies; and, means for modulating the wave energy broadcast by said marker beacon transmitter with a marker signal.

38. The system of claim 37 including a plurality of satellite receivers located generally centrally of said same sector for receiving transmissions from mobile telephones in said same sector.

39. The system of claim 38 including a central control unit connected to each of said base stations, said satellite receivers, said marker beacon transmitter and to a wire line telephone system for selectively controlling the broadcast of wave energy by said base stations and marker beacon transmitter and for selectively connecting said satellite receivers and said transmitter at said base stations to said wire line telephone system.

40. Apparatus for providing boradcast service in a mobile communication system service area comprising:
   first means at a first location in the service area for omnidirectionally broadcasting wave energy in a zone smaller than the service area and surrounding said first location; and,
   second means at said first location for directionally broadcasting wave energy in a plurality of sectors of the service area extending radially from said first location beyond a radially outward limit of said zone, said first and second means together providing broadcast service to at least a portion of the service area.

41. The apparatus of claim 40 wherein said wave energy is omnidirectionally broadcast in said zone at a first frequency and said wave energy is directionally broadcast in said sectors at frequencies differing from said first frequency.

42. The apparatus of claim 40 wherein said wave energy is directionally broadcast in adjacent of said sectors at differing frequencies and in at least some of said sectors at the same frequency.

43. The apparatus of claim 42 wherein said wave energy is omnidirectionally broadcast in said zone at a first frequency and said wave energy is directionally broadcast in said sectors at frequencies differing from said first frequency.

44. The apparatus of claim 40 including a plurality of satellite receivers remote from said central zone, each located centrally of one of said sectors of said service area to receive transmissions from mobile units in the respective ones of said sectors.

45. Apparatus for providing broadcast service in a mobile communication system service area comprising:
   first means at a first location in the service area for directionally broadcasting wave energy in a plurality of radially outwardly extending sectors of the service area;
   means for generating an idle channel marker signal; and,
   means responsive to said generating means and spaced radially outwardly from said first location generally centrally of each of said sectors for omnidirectionally broadcasting said idle channel marker signal in each of said sectors, said first means, said generating means and said broadcasting means together providing broadcast service in the service area.

46. The apparatus of claim 45 wherein said wave energy is directionally broadcast in adjacent of said sectors at differing frequencies and in at least some of said sectors at the same frequency.

47. The apparatus of claim 46 including a plurality of satellite receivers remote from said central zone, each located centrally one one of said sectors of said service area to receive transmissions from mobile units in the respective ones of said sectors.

48. The apparatus of claim 45 including second means at said first location for omnidirectionally broadcasting wave energy in a zone surrounding said first location, said sectors extending beyond a radially outward limit of said zone.

49. The apparatus of claim 48 wherein said wave energy is directionally broadcast in adjacent of said sectors at differing frequencies and in at least some of said sectors at the same frequency.

50. The apparatus of claim 49 including a plurality of satellite receivers remote from said central zone, each located centrally of one of said sectors of said service area to receive transmissions from mobile units in the respective ones of said sectors.

51. A system for providing communications in a mobile telephone service area comprising:
   a plurality of directional antennas at a first location, each directional antenna defining a geographical sector of the service area extending radially outwardly from the first location;
   means including a plurality of transmitters, a plurality of receivers, and said directional antennas for defining plural two-way radio communication channels serving each of said sectors individually, at least some of the same radio communication channels serving more than one of said sectors,
   means for designating one of said plural two-way communication channels in each of said sectors as a mobile monitoring channel;
   a plurality of mobile units each including means for monitoring said designated plural two-way communication channels; and,
   means connected to each of said communication channels defining means and to a wireline telephone system for selectively establishing communications between a mobile unit and either another mobile unit or a fixed telephone over one of said plural two-way radio communication channels serving the sector in which said mobile unit is monitoring a designated channel.

52. The system of claim 51 wherein each directional antenna has a directional characteristic including an angular beamwidth defining one of said predetermined sectors of the service area, the sum of the angular beamwidths of said directional antennas being at least 360°.

53. The system of claim 52 wherein adjacent of said directional antennas are oriented angularly relative to each other by an angle approximately equal to the sum of one-half of each angular beamwidth thereof.

54. The system of claim 52 wherein immediately adjacent of said sectors are served by different ones of the communication channels assigned to the system, the same communication channels serving at least some of the sectors spaced by at least one other sector whereby the same communication channel may be simultaneously used in more than one sector of the service area.

55. The system of claim 51 including second means at said first location for omnidirectionally broadcasting wave energy in a zone surrounding said first location, said sectors extending beyond a radially outward limit of said zone.

56. The system of claim 55 wherein said wave energy is directionally broadcast in adjacent of said sectors at differing frequencies and in at least some of said sectors at the same frequency.

57. The system of claim 51 including a plurality of base stations spaced from said first location and each including means for directionally broadcasting wave energy in a plurality of radially outwardly extending sectors of the service area, the spacing between adjacent base stations and the orientation of said directional broadcasting means being such that wave energy is broadcast in at least some of said sectors from a plurality of said base stations.

58. A system for providing continuity of communications over a plurality of dual frequency communication channels comprising:
   a plurality of base stations spaced throughout a service area, each base station including an array of directional antennas directionally defining a plurality of sectors of the service area extending radially outwardly from said base stations;
   means for establishing a call between a fixed communication unit and a mobile communication unit over an available one of said dual frequency communication channels through one of said base stations,
   means connected to said array of directional antennas at said one of said base stations for monitoring the signal strength of transmissions from said mobile unit engaged in said established call received over a first one of said directional antennas defining a first one of said sectors designated as a home sector;
   means connected to said monitoring means for detecting a drop in monitored signal strength received over said first one of said directional antennas below a predetermined threshold;
   means connected to said directional antennas and responsive to said detecting means for monitoring and comparing the signal strength of said transmissions from said mobile unit engaged in said established call received over only three of said directional antennas defining three monitoring sectors, the three monitoring sectors being adjacent to and surrounding said first one of said sectors, two of said three directional antennas defining said three monitoring sectors being at said one of said base stations and the third of said three directional antennas being at another of said base stations; and,
   means responsive to said comparing means for designating one of said three monitoring sectors as a new home sector.

59. The system of claim 58 including means responsive to said designating means for reestablishing said established call through another of said plurality of base stations.

60. The system of claim 59 wherein said established call is reestablished over the same one of said dual frequency communication channels.

61. A method for providing broadcast service in a mobile communication system service area comprising the steps of:
   omnidirectionally broadcasting wave energy in a zone surrounding a first location in the service area, said zone being smaller than the service area; and,
   directionally broadcasting wave energy from said first location in a plurality of sectors of the service area extending radially from said first location beyond a radially outward limit of said zone.

62. The method of claim 61 wherein wave energy is omnidirectionally broadcast in said zone at a first frequency and wave energy is directionally broadcast in said sectors at frequencies differing from said first frequency.

63. The method of claim 61 wherein wave energy is directionally broadcast in adjacent of said sectors at differing frequencies and in at least some of said sectors at the same frequency.

64. The method of claim 63 wherein wave energy is omnidirectionally broadcast in said zone at a first frequency and wave energy is directionally broadcast in said sectors at frequencies differing from said first frequency.

65. A method for providing broadcast service in a mobile communication system service area comprising the steps of:
   directionally broadcasting wave energy from a first location in the service area in a plurality of radially outwardly extending sectors of the service area;
   generating an idle channel marker signal; and,
   omnidirectionally broadcasting said idle channel marker signal in each of said sectors from locations spaced radially outwardly from said first location generally centrally of each of said sectors.

66. The method of claim 65 wherein said wave energy is directionally broadcast in adjacent of said sectors at differing frequencies and in at least some of said sectors at the same frequency.

67. The apparatus of claim 66 including the steps of receiving transmissions from mobile units in the respective ones of said sectors generally at said radially outwardly spaced locations.

68. A method for providing broadcast coverage of a mobile telephone service area comprising the steps of:
   providing first, second and third spaced base stations each including a plurality of transmitters;
   directionally broadcasting wave energy from each of said base stations in a plurality of sectors of the service are extending radially outwardly from said base stations, said wave energy being broadcast into at least some of said plurality of sectors from a plurality of said base stations.

69. A method for providing mobile telephone broadcast service comprising the steps of:
   directionally broadcasting wave energy into sectors of a service area from a plurality of directional antennas;
   generating an idle channel marker signal;
   modulating said wave energy broadcast into said sectors by said idle channel marker signal;
   reducing the output power level of said broadcast wave energy from a first predetermined level to a second predetermined level during the modulation of said wave energy by said idle channel marker signal.

70. In a mobile telephone communication system having a plurality of frequency communication channels assigned thereto, a service area including a plurality of mobile service sectors, and apparatus for providing service to mobile units throughout the entire mobile telephone service area, comprising:
   a plurality of transmitters and receivers,
   a plurality of essentially co-located directional antennas at a given location, each of said plurality of antennas being connected to at least one of said plurality of transmitters and receivers and each oriented to broadcast as well as receive wave energy in a different predetermined sector of the service area extending radially beyond said given location, thereby creating a plurality of mobile service sectors.

the frequencies broadcast from first alternate sectors created around said co-located directional antennas being different from the frequencies broadcast from the second alternate or intervening sectors of said antennas, with the latter sectors serving as buffers between the first alternate sectors, and thus permitting non-interfering reuse of frequencies within the entire service area.

71. The mobile telephone system as defined in claim 70 in combination with an omnidirectional antenna serving to define a central zone, said omnidirectional antenna broadcasting frequencies different from either of the frequencies of assigned to said first and second alternate sectors.

72. The mobile telephone system as defined in claim 71 in which receiver voting equipment is utilized on the output of each receiver used in said system, said equipment being utilized for ascertaining the strongest signal for the purpose of transmitter/sector selection, as mobile units engaged in calls move from sector to sector.

73. The mobile telephone system as defined in claim 72 in which a central processing unit is utilized in order to selectively connect incoming and outgoing calls between appropriate components of the system, and to perform adaptive channel assignment during mobile unit sector transfer.

74. In a mobile communication system having a plurality of dual frequency communication channels assigned thereto, apparatus for providing broadcast service from a central location to mobile unit throughout a mobile communication service area comprising:
- a plurality of transmitters at a central location;
- a plurality of essentially co-located directional atennas at the central locations; and,
- means connecting each of said plurality of antennas to at least one of said plurality of tranmitters;
- a plurality of antennas being oriented to broadcast wave energy in predetermined respective sectors of the mobile telephone service area extending radially outwardly from the central location, so as to define a plurality of directionally separate broadcast sectors of the service area;
- said connected transmitters being tuned so as to broadcast wave energy in adjacent of said broadcast sectors at differing frequencies and to broadcast wave energy in at least some of the sectors at the same frequency, whereby different communication channels serve adjacent of said broadcast sectors and the same communication channel serves more than one of said broadcast sectors.

75. The apparatus of claim 74 including a plurality of satellite receivers remote from said central zone, each located centrally of one of said sectors of said service area.

76. The apparatus of claim 74 wherein said sectors are defined by the directional characteristics of said directional antennas; and,
wherein immediately adjacent of said sectors overlap in area by an amount less than the area of any one of said sectors.

77. The apparatus of claim 74 including a plurality of beacon transmitters radially remote from said central zone, at least one of said beacon transmitters being located approximately centrally of each of said sectors beyond said central zone and including means to omnidirectionally broadcast wave energy; and
means associated with each of said beacon transmitters for modulating the wave energy broadcast thereby with a marker signal.

78. A method for providing broadcast service from a base station to mobile units throughout a mobile communication service area comprising the steps of broadcasting wave energy directionally from the base station into a plurality of sectors of the service area so as to define a plurality of directionally separate broadcast sectors of the service area, the sectors extending radially outwardly from the base station in different directions and the wave energy being broadcast in adjacent of the sectors at differing frequencies and being broadcast in at least some of the sectors at the same frequency.

79. The method of claim 78 including the further steps of generating an idle channel marker signal and omnidirectionally broadcasting the idle channel marker signal in each of said sectors from locations spaced radially from the base station, the locations being generally central of each of the sectors.

* * * * *